Nov. 18, 1969  L. DILGER ET AL  3,478,854
FUEL DISPENSING APPARATUS CONTROL SYSTEM
Filed March 28, 1967  14 Sheets-Sheet 9

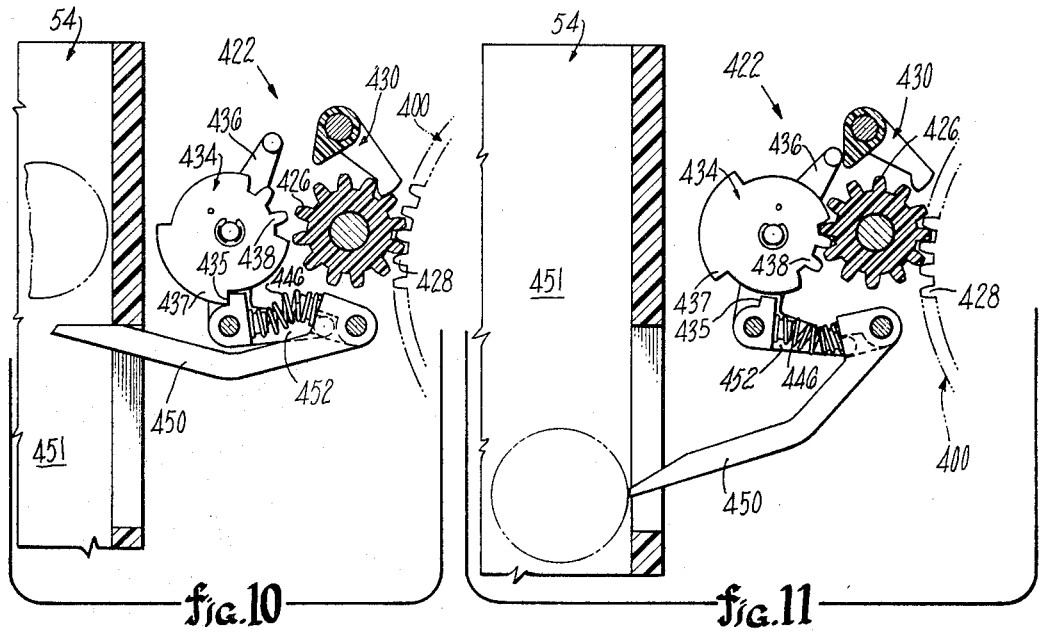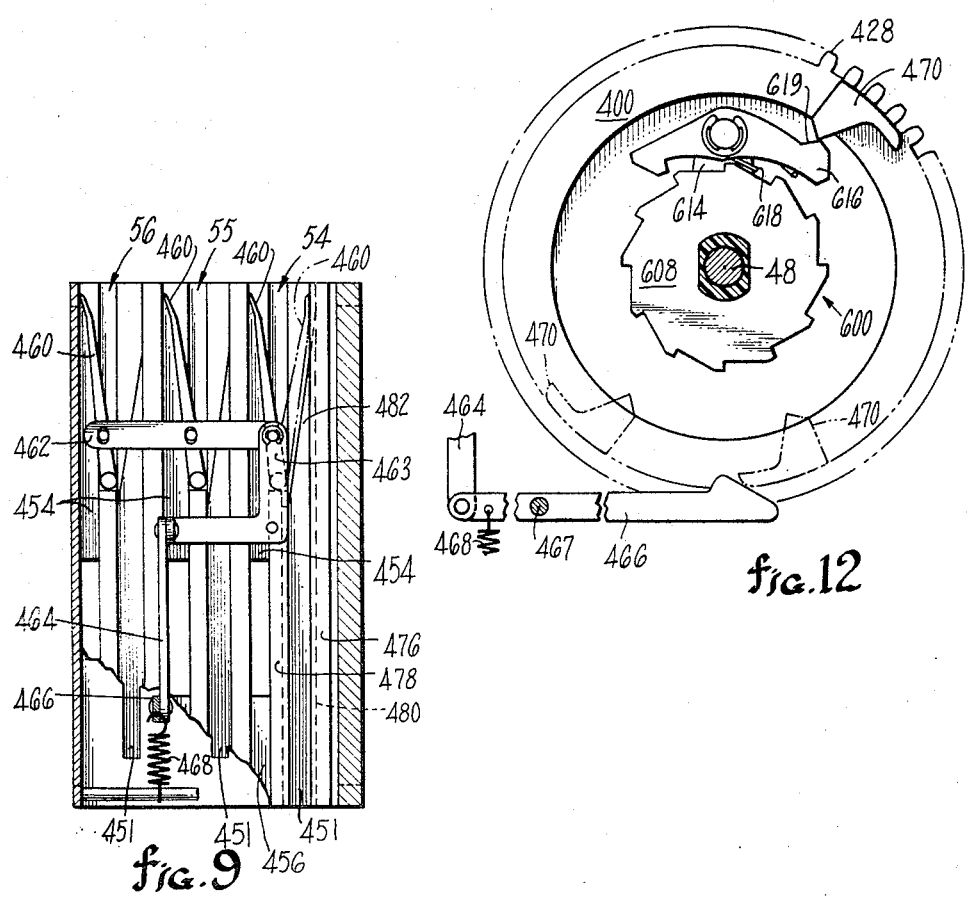

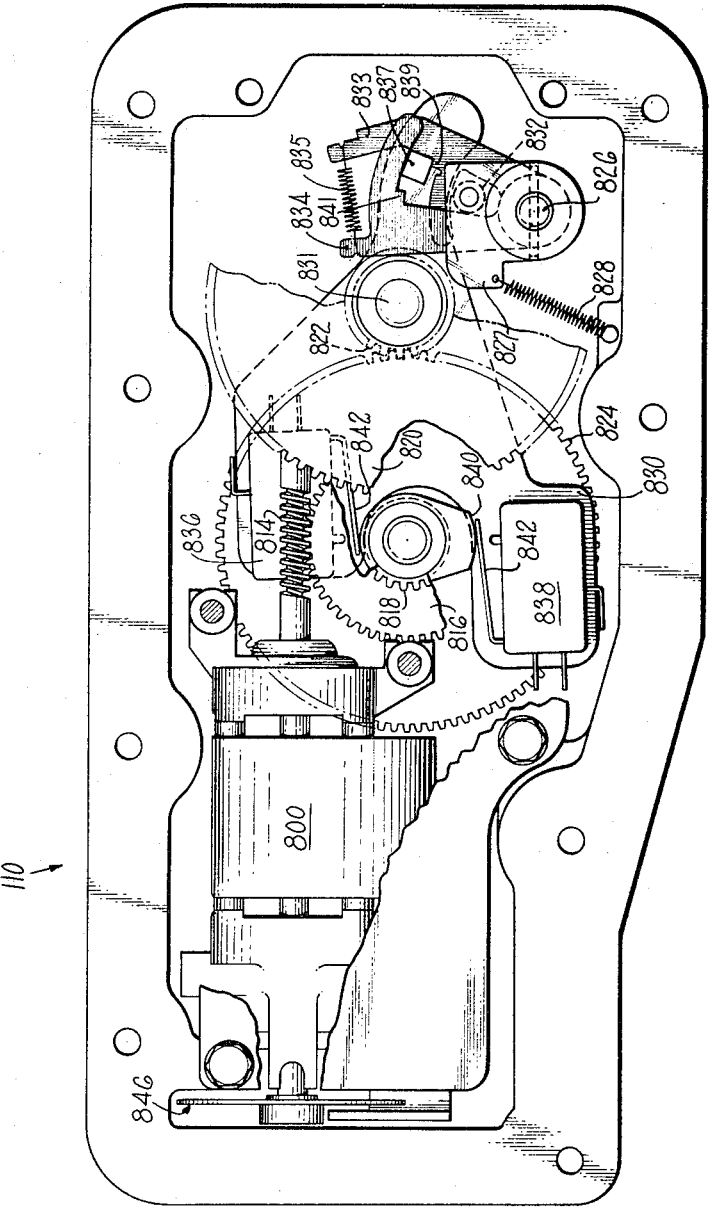

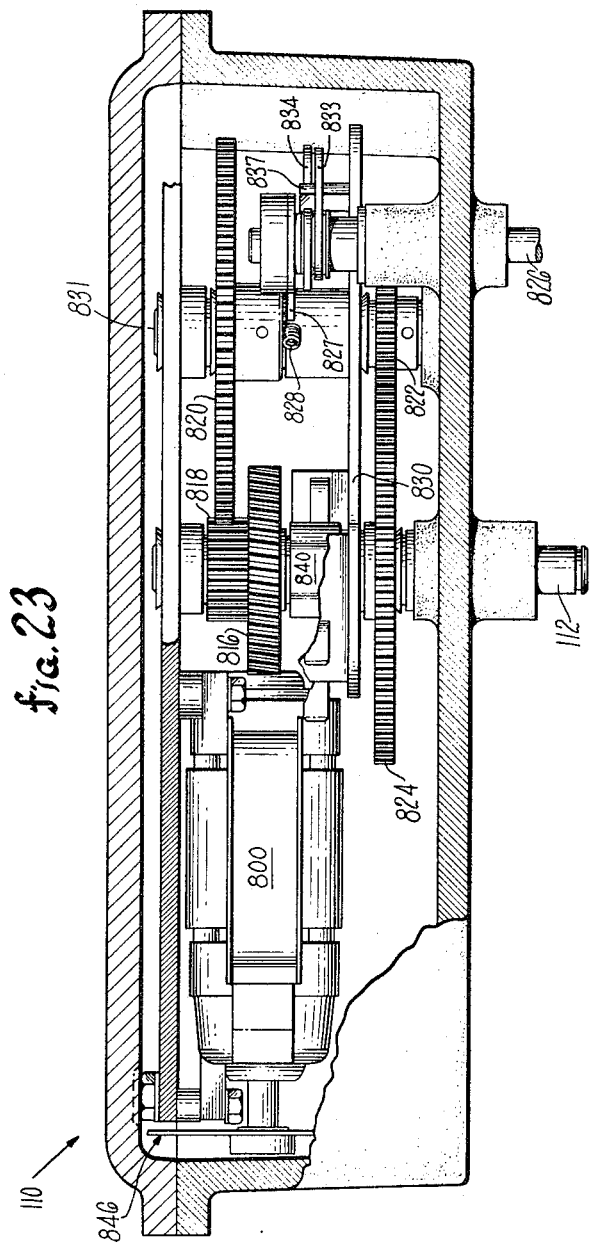

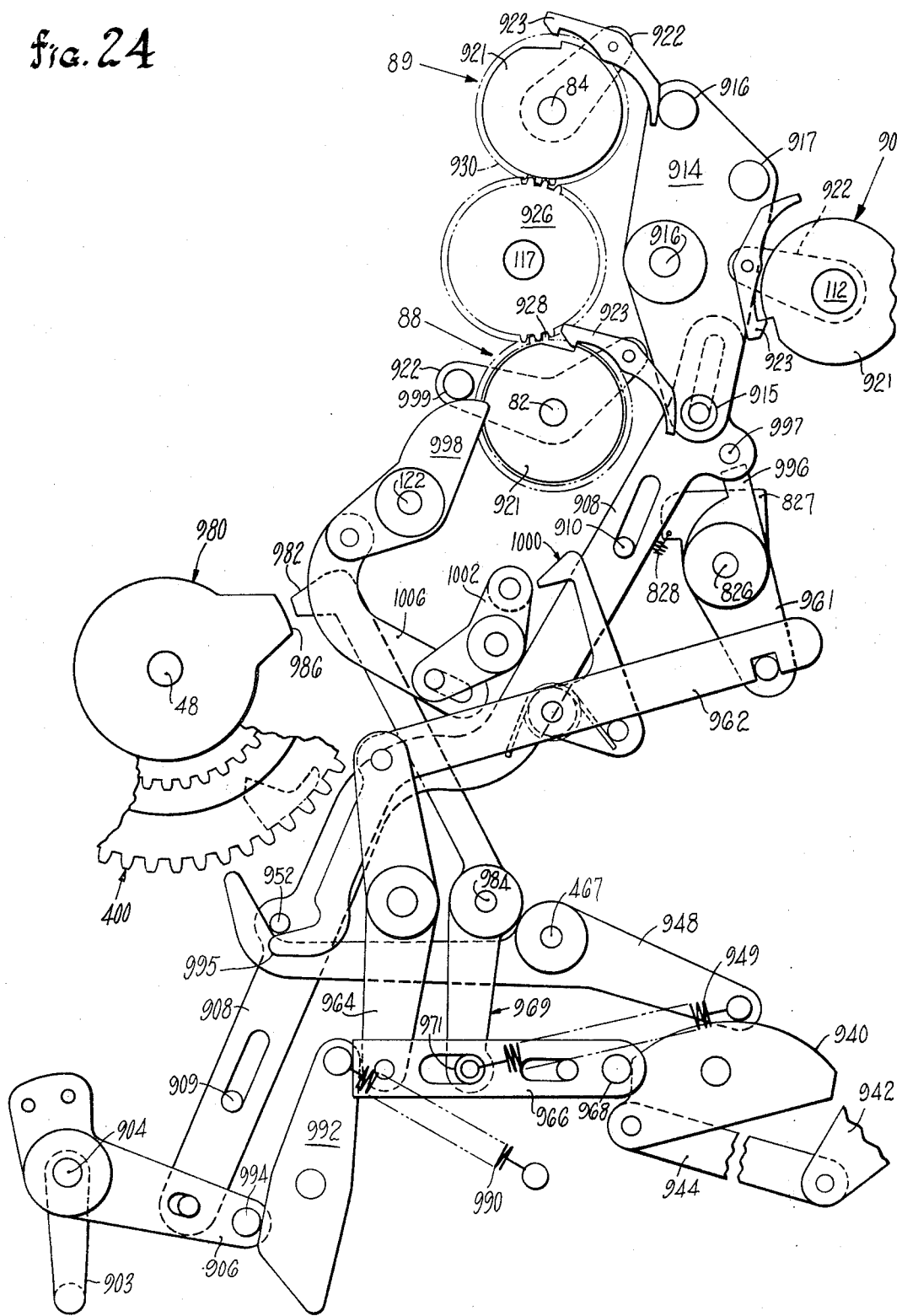

_United States Patent Office_

3,478,854
Patented Nov. 18, 1969

3,478,854
FUEL DISPENSING APPARATUS CONTROL SYSTEM
Lawrence Dilger, South Croydon, and Ernest Stanley Ashford, Felbridge East Grinstead, England, assignors to Veeder Industries Inc., Hartford, Conn., a corporation of Connecticut
Filed Mar. 28, 1967, Ser. No. 626,565
Claims priority, application Great Britain, Jan. 24, 1967, 14,529/67
Int. Cl. G07f *15/00, 13/02, 9/04*
U.S. Cl. 194—3                                  46 Claims

ABSTRACT OF THE DISCLOSURE

Fuel dispensing apparatus having both coin operated and push button preselecting mechanisms for preselecting the amount of fuel to be delivered. An electrical drive motor is energized when the fuel nozzle is removed from its storage receptacle to reset the register of the dispensing apparatus and to set up a preset mechanism in accordance with the preselected amount in the coin operated or push button preselecting mechanism. A coin refund mechanism is provided for returning coins approximately the amount of fuel paid for and not delivered at the end of the delivery and a printer is provided for recording the amount of fuel delivered, and when the fuel nozzle is returned to its storage receptacle the electric drive motor is energized to operate the refund mechanism and printer and to reset the coin operated push button preselecting mechanisms. An interlock mechanism is provided for setting up the apparatus for manual preselection with the push button preselecting mechanism or for coin operation with the coin operated preselecting mechanism. The coin refund mechanism has a rotary refund controller with refund control cams which are mechanically coupled to the preset mechanism to continually provide for setting the refund mechanism for refunding coins having a total value approximating the amount of fuel paid for and not delivered.

---

This invention relates generally to fluid dispensing or delivery apparatus conventionally employed for delivering liquid fuel, for example petrol, and is particularly concerned with a control system for fluid dispensing apparatus which provides for delivering preselected quantities of fluid with the apparatus. The quantity of fluid to be delivered may be preselected by a coin actuated mechanism or by a manually actuated mechanism or by other preselecting means capable of providing an output indicative of the amount of fluid to be delivered.

Coin actuated preselecting mechanisms and manually actuated preselecting mechanisms for preselecting the amount of fluid, for example fuel, to be delivered are known in which the deposit of coin or coins in the coin actuated mechanism or the manual operation of the manually actuated mechanism provides for directly controlling the operation of the dispensing apparatus for automatically discontinuing the delivery of fluid after the preselected amount of fluid has been delivered.

It is a main object of the present invention to provide a control system for a fluid dispensing apparatus having a settable presetting mechanism or delivery control means which is operable for automatically discontinuing the delivery of fluid after a preset amount of fluid has been delivered, a preselecting device or presetter means which may be set for preselecting the amount of fluid to be delivered, and a scanning device for setting the preset mechanism in accordance with the setting of the preselecting device.

The preselecting device may, for example, include a manually operable presetter or preselector and/or a coin, token or like operated presetter or preselector which is operated in accordance with the value of coins, tokens, or the like (hereinafter referred to in the specification and claims as "coins"), deposited therein, and the scanning device may provide for sensing the selection of the preselecting device and for loading the presetting mechanism in accordance with this selection.

Preferably, the presetting mechanism comprises rotary control means angularly settable for controlling the amount of the fluid delivery.

Preferably said rotary control means is adapted to be indexed by indexing means in one angular direction in accordance with the amount of fluid delivered, and means are provided for terminating the fluid delivery when the rotary control means reaches a predetermined angular position.

Preferably the scanning device provides for angularly setting the rotary control means in said one angular direction.

Preferably said scanning device comprises a scanner output operable for setting the presetting mechanism, and a scanner input connected for operating the scanner output in accordance with the preselected amount of the presetter means.

Preferably said scanning device comprises disengageable means connecting the scanner input and output, and wherein the presetter means is operative to disengage the disengageable means so as to disengage the scanner input and output when the presetting mechanism is set in accordance with the preselected amount of the presetter means.

The scanning device may comprise a rotary scanner adapted to be rotated to scan the position of said presetter means and set the presetting mechanism in accordance with said position of said presetter means.

Preferably said disengageable means provides one-way drive means between the scanner input and output.

Preferably said disengageable means comprises a driving ratchet wheel and a driven ratchet pawl mounted for rotation coaxially with the ratchet wheel means, said pawl being engageable with the ratchet wheel for engagement of the disengageable means, and wherein the presetter means comprises pawl release means for selectively disengaging the ratchet pawl from the ratchet wheel in accordance with the preselected amount of the presetter means.

Preferably said pawl release means comprises stop means engageable by the ratchet pawl and selectively positionable for selectively disengaging the ratchet pawl from the ratchet wheel.

Preferably the presetter means comprises a rotary preselector adapted to be angularly positioned to preselect the amount of fluid to be delivered.

The rotary control means may be connected so as to be angularly indexed from its preset angular position towards a "zero" angular position as fluid is dispensed, and as the rotary control means approaches its "zero" angular position suitable means is actuated for automatically terminating the delivery of fluid. For this purpose the fluid dispensing apparatus may include a known type of two step shut-off valve, the presetting mechanism may be connected to provide for partially closing the shut-off valve as the rotary preselector approaches its "zero" angular position, and the dispensing apparatus may include in a known manner means for completely closing the shut-off valve after a subsequent delivery of a relatively small quantity of fluid.

Preferably the scanning device is operable for setting the presetting mechanism in accordance with the angular position of the rotary preselector, and preferably said rotary preselector is adapted to be rotated in one angular direction for increasing the preselected amount, and the scanning device is rotatable in the opposite angular direction for setting the presetting mechanism.

Preferably the rotary preselector comprises a coin-operated mechanism.

Preferably said coin-operated means comprises preselector indexing means for angularly indexing the rotary preselector in accordance with the value of deposited coins.

Preferably the coin-operated preselector indexing means is operable by coins or tokens or other checks of more than one denomination, and the coin operated presetter has a separate chute and a separate mechanism for the coins of each denomination which provides for angularly indexing the rotary preselector from a predetermined angular position thereof in accordance with the relative value of the corresponding coin deposited. The angular position to which the rotary preselector is indexed is representative of the value of the coins deposited and accordingly the preselected amount of fluid to be delivered.

The control system may also employ a coin rejector which is adapted to reject unacceptable coins or tokens and to separate the acceptable coins or tokens in accordance with their denomination and to direct the coins of each denomination into the appropriate chute of the coin-operated presetter.

Preferably the control system includes a coin refund means which are operable to provide for refunding coins at the end of a delivery in accordance with the difference between the amount of fluid preselected with the coin-operated means and the amount of the fluid delivered.

Preferably said refund means comprises a settable refund controller for controlling the amount of refund.

Preferably the refund controller is set in accordance with the setting of the presetting mechanism for establishing a refund in accordance with said difference.

Preferably said refund controller is rotatable and angularly settable for controlling the amount of refund, and the rotatable refund controller is angularly positioned at the end of a fluid delivery in accordance with said difference.

Preferably the refund controller and the presetting mechanism are mechanically coupled so that the refund controller is continuously set in accordance with the setting of the presetting mechanism.

Preferably the refund controller is set by the scanning device when it is operated for setting the presetting mechanism.

Preferably said coin refund means includes coin reservoir means and coin return means operable for returning coins from the reservoir means in accordance with the setting of the refund controller.

Preferably the coin return means is operable for de-activating the refund means before the commencement of the fluid delivery, and is operable for returning coins from the reservoir means in accordance with the setting of the refund controller after the completion of the fluid delivery.

Preferably said control system also includes resettable printing means operable for recording the fluid delivery. The amount of fluid delivered may be recorded by imprinting a ticket with the volume of the fluid delivered and/or the cost of the fluid delivered and/or the value of the coins or tokens used to pay for the fluid delivered.

Said printing means preferably comprises resettable used coin printing mechanism operable by the presetting mechanism for recording the monetary amount of the used coins. Said used coin printing mechanism is preferably resettable with the presetting mechanism set in accordance with the amount preselected with the presetter means, and is indexed during the delivery of fluid.

Preferably the used-coin printing mechanism is indexed by the presetting mechanism during the delivery of fluid.

The control system is preferably actuated by motor means, and such motor means may be an electric motor.

Preferably said motor means is connected for setting the presetting mechanism in accordance with the preselected amount of the presetter means before the commencement of the fluid delivery, and is connected for resetting the presetter means after the completion of the fluid delivery.

The control system may be incorporated in fluid dispensing apparatus having a resettable register for registering the amount of fluid delivered, and in such a case said motor means may be connected for resetting the register prior to the commencement of the fluid delivery.

Preferably said motor means provides for operating the coin return means after the completion of the fluid delivery for returning coins in accordance with the setting of the refund controller.

Preferably said motor means provides for operating the coin return means to de-activate the refund mechanism before the commencement of the fluid delivery.

Preferably said motor means provides for resetting the printing means before the commencement of the fluid delivery, and provides for operating the printing means after the completion of the fluid delivery.

Preferably the presetter means comprises remote preselector means located remotely from the fluid dispensing apparatus.

Preferably said presetter means comprises manual preselector means for manually preselecting the amount of fluid to be delivered.

The control system of the invention also preferably comprises selector means operable for alternatively conditioning the scanning device for setting the presetting mechanism in accordance with the amount preselected by the manual preselector means or the coin-operated means.

Preferably said selector means comprises scanner clutch means for alternatively conditioning the scanning device for setting the presetting mechanism in accordance with the amount preselected by the manual preselector means or the coin-operated means.

Preferably said scanner clutch means comprises first clutch means for the manual preselector means and second clutch means for the coin-operated means, and the selector means is manually operable for alternatively disengaging the first and second clutch means.

Preferably said first and second clutch means each comprise a driving ratchet wheel and a driven pivotal ratchet pawl engageable with the ratchet wheel for engagement of the clutch means and adapted to be pivotally withdrawn for disengagement of the clutch means, and the selector means further comprises clutch control means manually operable for alternatively pivotally withdrawing the ratchet pawls of the first and second clutch means.

Preferably said driving ratchet wheels have a single notch.

Preferably said selector means is operable to de-activate the refund means when it is operated to condition the scanning device for setting the presetting mechanism in accordance with the amount preselected by the manual preselector means.

Preferably, said motor means is connected to rotate a drive shaft through a first part of a revolution, for example one-half revolution, during the first phase of the power operator cycle, and to rotate the drive shaft through the remaining part of the revolution during the second phase of the power operator cycle.

Preferably, said motor means is energized to complete the first phase of the power operator cycle when the usual fluid dispensing nozzle is removed from its storage receptacle, and the electric drive motor is energized to complete the second phase of the power operator cycle when the dispensing nozzle is restored within its storage receptacle.

Preferably the control system comprises a timer which is loaded and tripped upon the operation of the motor means through its first phase, and which is adapted to automatically terminate the fluid delivery after a predetermined interval of time, for example, five minutes.

Preferably the timer is connected to the motor means so as to operate the motor means through its second phase of operation after the predetermined interval of time has taken place.

Preferably the printing means, hereinbefore referred to, is operated by the motor means so as to imprint a ticket and thereby record the amount of the fluid delivery during the second phase of the power operator cycle and so as to reset the printing means during the first phase of the power operator cycle.

Other objects will be in part obvious and in part pointed out more in detail hereinafter.

The invention accordingly consists in the features of construction, combination of elements and arrangement of parts which will be exemplified in the construction hereafter set forth, and the scope of the application of which will be indicated in the appended claims.

In the drawings:

FIG. 9 is a transverse section view, partly broken away and partly in section, of the combined coin operated presetter and scanner taken substantially along line 9—9 of FIG. 8;

FIG. 10 is a fragmentary longitudinal section view, partly broken away and partly in section, of the combined coin operated presetter and scanner, additionally showing in broken lines a coin passing downwardly in a coin chute thereof;

FIG. 11 is a fragmentary longitudinal section view similar to FIG. 10 showing the coin operation of the coin operated presetter;

FIG. 12 is an enlarged longitudinal section view, partly broken away and partly in section, showing the rotary accumulator and scanner of the combined coin operated presetter and scanner;

FIG. 22 is an elevation view, partly broken away and partly in section, of a power operator employed in the control system;

FIG. 23 is a bottom plan view, partly broken away and partly in section, of the power operator; and FIG. 24 is an enlarged generally diagrammatic elevation view, partly broken away, showing an interlock and linkage arrangement employed in the control system.

Figure 1:
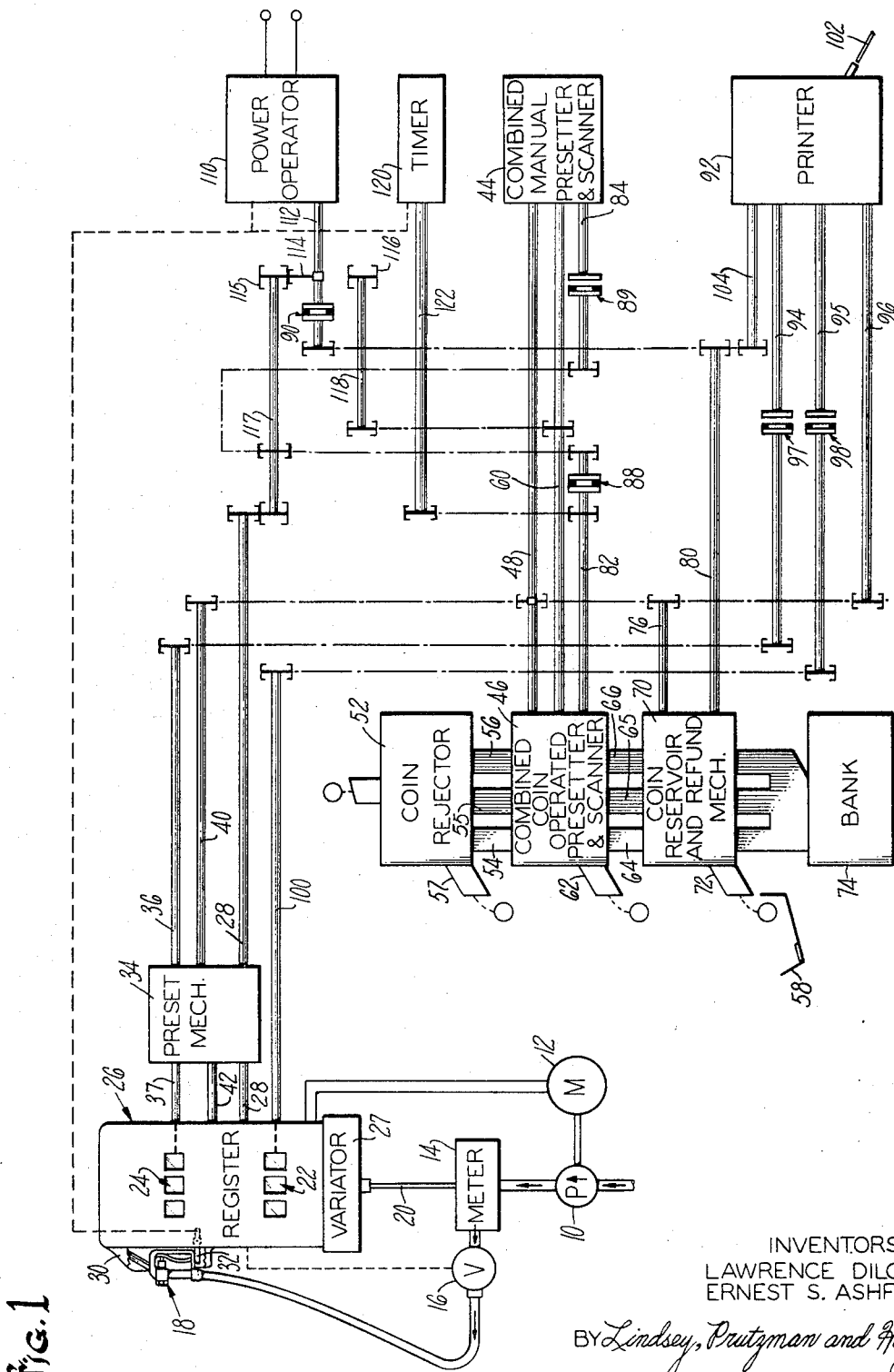
FIG. 1 shows a schematic representation of a fuel dispensing apparatus incorporating the control system of the present invention.

The fuel dispensing apparatus shown diagrammatically in FIG. 1 incorporates in a conventional manner, a fuel pump 10 driven by a motor 12 for supplying fuel through a meter 14 and a two stage shut-off valve 16 to a fuel dispensing nozzle or hosecock 18. The output shaft 20 of the meter 14 is rotated in proportion to the volume of fuel dispensed and drives the usual volume and cost counters 22, 24 of the register 26. A variator 27 intermediate the meter 14 and register 26 is employed in a known manner for adjustably selecting the price per unit of volume dispensed.

The register 26 incorporates a suitable reset mechanism which is operated by a reset shaft 28 to resret the register and thereby zeroize the cost and volume counters 22, 24 and which is conventionally cycled after each delivery of fuel and before the succeeding delivery of fuel commences. The reset mechanism also provides for opening the shut-off valve 16 and for energizing the pump motor 12 at the end of the reset cycle and after the counters are reset.

The fuel nozzle 18 is shown provided in a conventional manner with a storage receptacle or boot 30 for storing the nozzle between fuel deliveries. A suitable lever 32 is shown mounted in the storage receptacle 30 for sensing when the fuel nozzle 18 is withdrawn from its storage receptacle and when the fuel nozzle is replaced in its storage receptacle.

Figure 2:
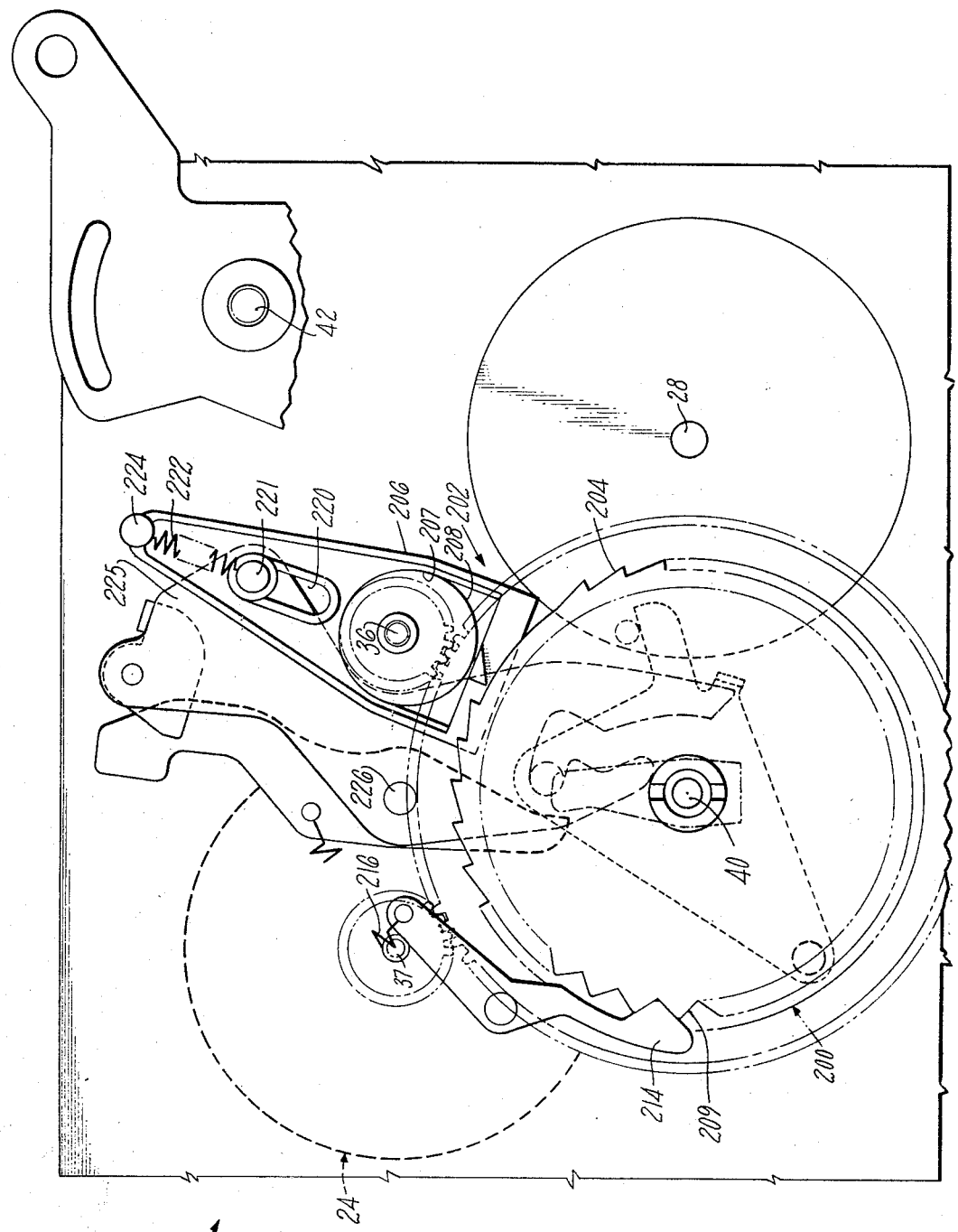
FIG. 2 is an elevation view, partly broken away, showing a preset mechanism employed in the control system.

Referring to FIGURES 1 and 2, there is shown a settable presetting mechanism 34, generally of the type disclosed in United States Patent No. 2,665,030, dated Jan. 5, 1954, and entitled "Preselector Mechanism for Liquid Dispensing Apparatus" which is provided for presetting the amount of the succeeding fuel delivery and for discontinuing the delivery after the preset amount has been dispensed.

Briefly, the presetting mechanism 34 comprises a preset shaft 40 which drives and is driven by a rotary preset wheel 200 that is adapted to be angularly indexed, in the counterclockwise direction as viewed in FIGURE 2, towards its "zero" angular position as fuel is dispensed. The preset wheel 200 is indexed by a ratchet pawl and ratchet wheel drive 202 which in the preferred embodiment is driven by a count down or money shaft 36 that is connected through suitable gearing to a shaft 37 which also drives the right hand or lowest order number wheel of the cost counter 24. The angular movement of the count down shaft 36 is, therefore, a function of the monetary amount of the fuel delivered, and the preset wheel 200 is accordingly adapted to be angularly indexed with the ratchet pawl and ratchet wheel drive 202 in accordance with the monetary amount of fuel dispensed. The presetting mechanism 34 employs suitable means, incompletely shown, for closing the two stage shut-off valve 16 with a valve operating shaft 42 and for thereby discontinuing delivery of fuel after the preset amount of fuel has been delivered. More particularly, as the preset wheel 200 is indexed to its "zero" angular position shown in FIGURE 2 it operates to trip a latching mechanism, incompletely shown, for the valve operating shaft 42 and thereby partially close the two stage shut-off valve 16. The latching mechanism is thereafter tripped again by the count down shaft 36 to fully close the shut-off valve after a subsequent delivery of a relatively small volume of fuel and to terminate the delivery in accordance with the preset amount.

In a similar manner the presetting mechanism 34 could be connected as, for example, to the lowest order number wheel of the volume counter 22 to discontinue the fuel delivery after a predetermined or preset volumetric amount of fuel has been delivered.

The ratchet pawl and ratchet wheel drive 202 is shown comprising a thirty-three tooth ratchet wheel 204 formed on the preset wheel 200 and a ratchet drive pawl 206 having a U-shaped guide or bearing surface 207 engageable by an eccentric or cam 208 mounted on the count down shaft 36 and adapted for indexing the ratchet wheel 204 one tooth for each revolution of the count down shaft 36. A thirty-three tooth detent wheel 209 formed on the preset wheel 200 and a pivotal detent pawl 214 biased into engagement with the detent wheel 209 by a spring 216 are provided for holding the preset wheel 200 in each indexed angular position. Also the ratchet wheel 204 is shown contoured with three teeth missing to provide for disengaging the ratchet pawl and ratchet wheel drive 202 when (1) the preset wheel 200 is in its "zero" angular position and (2) the preset wheel 200 is in a "manual delivery" angular position providing for a "manual delivery" that is not controlled by the preset mechanism.

The drive pawl 206 has a radially extending slot 220 receiving a supporting pivot pin 221 to permit the pawl 206 to be withdrawn from and returned into engagement with the ratchet wheel 204 as the count down shaft 36 is rotated. A tension spring 222 is connected between the pivot pin 221 and a post 224 on the tailend of the drive pawl 206 to maintain the semicircular bearing surface 207 of the pawl in engagement with the eccentric 208.

The drive pawl 206 is mounted on a supporting plate 225 pivotally mounted on a post 226 and adapted to be pivoted, in the counterclockwise direction as viewed in FIG. 2, from its operative pivotal position shown in FIG. 2, for withdrawing the pawl from the ratchet wheel 204 to free the ratchet wheel and thereby permit the count down shaft 36 to be rotated with the lowest order number wheel of the cost counter when the register is reset. For this purpose the pawl supporting plate 225 is pivoted by a suitable mechanism, incompletely shown, which is operated by the reset shaft 28 to maintain the drive pawl 206 withdrawn while the register is being reset and while the preset wheel 200 is being set for the succeeding delivery.

The preset wheel 200 is angularly preset from its "zero" angular position, or from some other angular position as when the preceding preset amount was not completely dispensed during the preceding delivery, by the preset shaft 40 by rotation thereof, in the counterclockwise direction as viewed in FIGURE 2, and accordingly in the same angular direction as it is indexed by the count down shaft 36.

The preset shaft 40 is adapted to be angularly rotated to set the preset wheel 200 in accordance with the amount of fuel preselected manually by a manual presetter or preselector forming a part of a combined manual presetter and scanner 44, or by the amount of fuel preselected by coins, deposited in a coin-operated presetter or preselector forming a part of a combined coin-operated presetter and scanner 46. An output shaft 48 of the manual and coin-operated preselectors 44, 46 is suitably connected to the preset shaft 40 to provide a 1:1 drive ratio therebetween. The output shaft 48 is employed to intially set or load the preset wheel 200 of the preset mechanism 34 and to thereafter rotate with the preset wheel 200 as fuel is dispensed, and accordingly, the angular position of both the preset shaft 40 and the output shaft 48 continually represent the amount of fuel set into the preset mechanism 34 and yet undelivered.

Referring to FIGURES 3 to 6, the manual preselector comprises a plurality of annularly arranged preselector buttons 300 which are adapted to be individually pressed to select the amount of fuel to be delivered. The preset buttons are individually biased outwardly to their withdrawn or inactive position by suitable compression springs 302, and a flat locking ring 304 having a plurality of annularly arranged openings 306 in alignment with the push buttons 300 is provided for individually locking the buttons in their depressed or "active" positions. The locking ring is provided with circumferential slots 307 receiving mounting pins 308 for permitting limited angular movement of the ring, and a tension spring 309 is provided for biasing the locking ring 304 to an offset angular position where the openings 306 are slightly offset from the push buttons 300. The push buttons have conically tapered inner ends 310 and annular grooves 312 inwardly thereof, and when depressed are adapted to angularly displace the locking ring to release any buttons previously locked thereby and to be thereafter locked in their depressed or "active" position as a result of the receipt of the ring in the annular groove 312 of the depressed button. Thus each of the push buttons 300 may be individually depressed to release the remaining buttons and to preselect the amount of fuel corresponding to the depressed button.

A pivotally mounted control lever 314 is shown provided for automatically releasing the depressed or active push button 300 and for this purpose has an axially projecting tab 315 which is received within an opening 316 of the locking ring 304. The lever 314 is pivotally biased outwardly by a torsion spring 318 and the tab 315 is thereby normally positioned in a radial outer portion of the opening 316. A one-way operating pawl 322 is pivotally mounted on an arm 323 of a preselector reset shaft 60 and is pivotally biased to its extended position shown in FIGURE 6 to provide for engagement with an axially projecting pin 224 on the lever 314 and thereby actuate the lever 314 inwardly to its "active" position as the reset shaft 60 is rotated, in the clockwise direction as viewed in FIGURE 6.

Figure 6:
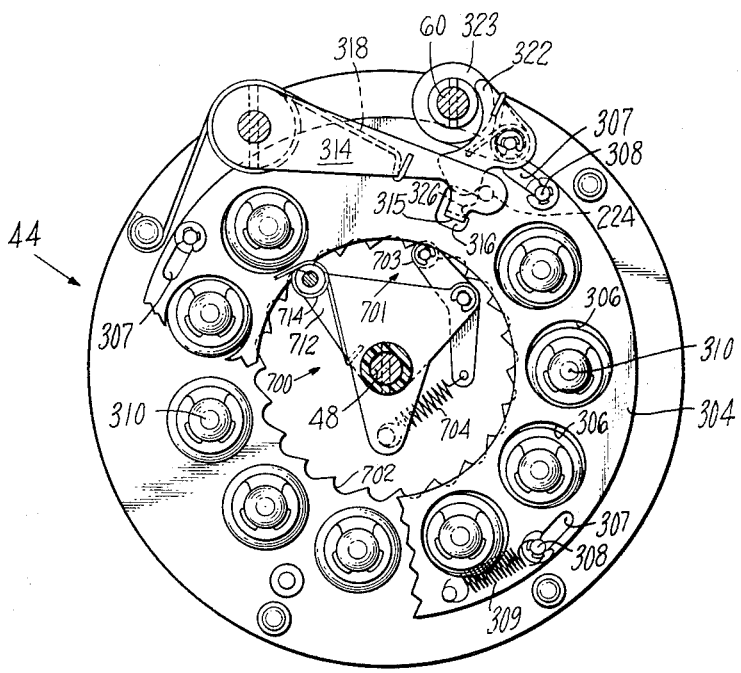
FIG. 6 is a transverse section view, partly broken away and partly in section, of the combined manual presetter and scanner.

A projection 326 of the locking ring 304 which functions as a combined cam and lock is thereby engaged by the tab 315 of the control lever 314 to angularly cam the locking ring against the bias of the spring 309 to release any depressed or "active" push buttons and additionally to thereafter lock the lever 314 in its inward or "active" position shown in FIGURE 6. With the lever 314 so positioned the tab 315 may provide in effect preselector means in lieu of an "active" push button for (1) setting the preset mechanism 34 at its "zero" angular position and thereby condition the preset mechanism for preventing the delivery of fuel, or (2) setting the preset mechanism at its "manual delivery" position where the pawl and ratchet drive 202 is disengaged to de-activate the automatic cutoff feature of the preset mechanism 34 and thereby provide for unlimited delivery of fuel, or (3) setting the preset wheel 200 at some "maximum delivery" position so that the presetting mechanism 34 would discontinue the delivery after some predetermined amount of fuel is delivered. Of course when a push button 300 is depressed, the lever 314 is released to return to its withdrawn or "inactive" position.

Presetter means in the form of a preselecting device having a remote preselector and a suitable repeater at the dispensing station, for example a preselecting device having remotely operated selectors and a repeater with selectors which function like the push buttons 300, may be employed for remotely preselecting the amount of fuel to be delivered. In this respect it is contemplated that the remote preselector may be manually operated or for example be automatically controlled, in accordance with each customer's credit.

Referring to FIGURES 7 to 12, the coin-operated preselector or presetter means is operated by coins inserted into a coin rejector 52 and which if accepted by the rejector 52 are separated into denominations and directed into the appropriate denomination chutes 54, 55, 56 for directing the coins to the coin-operated indexing mechanisms of the coin-operated presetter means (hereinafter referred to in the specific description as a "presetter"). The unacceptable coins are ejected out the chute 57 into a return receptacle 58.

Figure 7:
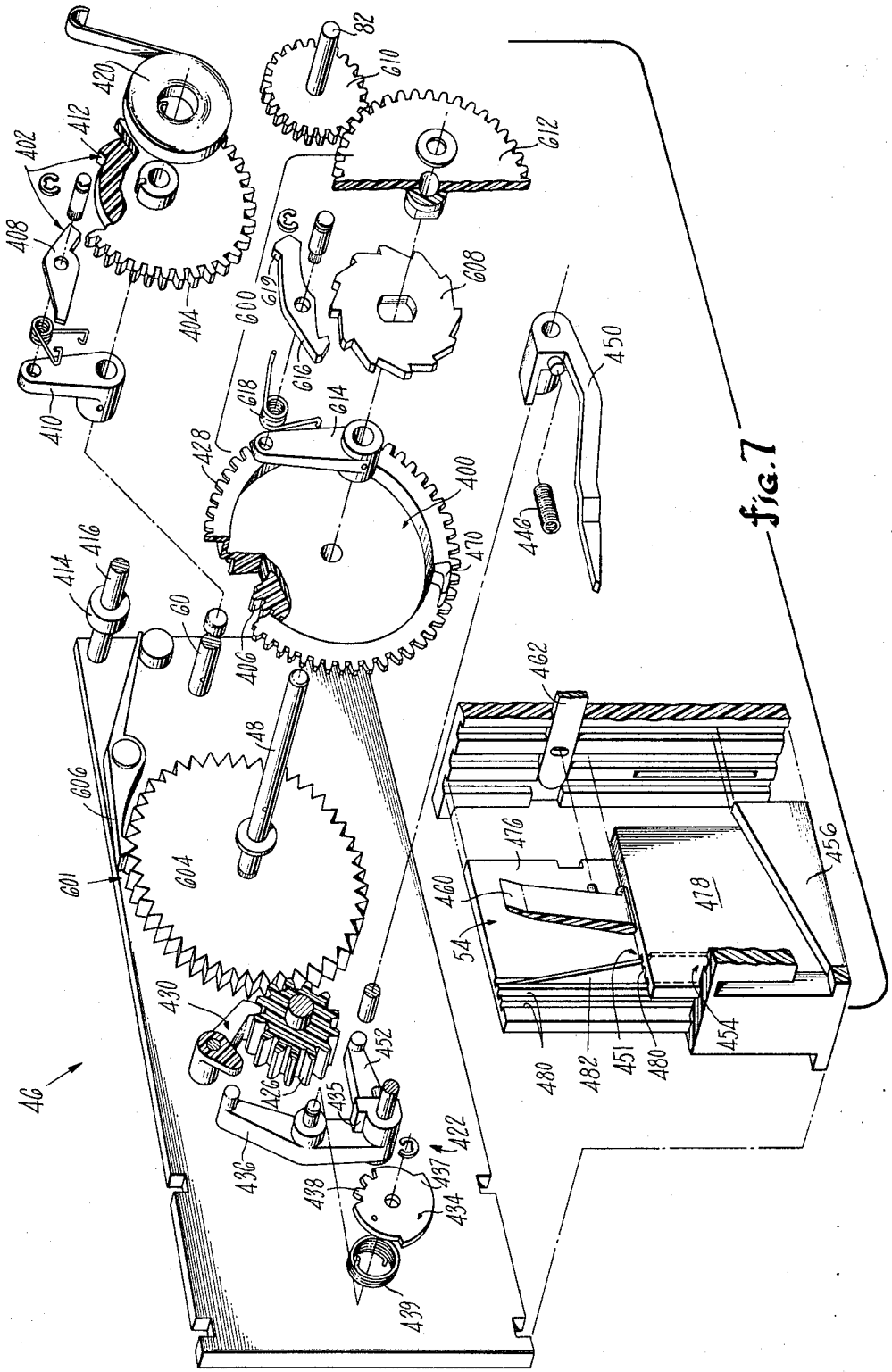
FIG. 7 is a partially exploded perspective view, partly broken away and partly in section, of a combined coin operated presetter and scanner therefor employed in the control system.

The coin-operated presetter means comprises a rotary preselector in the form of an accumulator wheel 400 which is adapted to be angularly reset, in the counterclockwise direction as viewed in FIGURES 7 and 12, to a "zero" angular position by rotation of a preselector reset shaft 60. The preselector reset shaft 60 is connected to the accumulator wheel 400 by a one-way drive mechanism or disengageable clutch 402, and a pair of meshing gears 404, 406 of the same diameter. The disengageable clutch 402 comprises a drive pawl 408 pivotally mounted on an arm 410 fixed to the preselector reset shaft 60 and a driven cam or ratchet wheel 412 formed with the gear 404 and engageable by the drive pawl 408. The drive pawl 408 is pivotally biased into engagement with the cam 412 so as to rotate the cam 412 and thereby the accumulator wheel 400 as the preselector reset shaft 60 is rotated, in the clockwise direction as shown in FIGURE 7. A collar or cam 414 is mounted on a post 416 for engagement by the tailend of the pawl 408 and so that the pawl 408 will be withdrawn from the cam 412 to disengage the one-way drive mechanism 402 when the accumulator wheel 400 is in its "zero" angular position. The preselector reset shaft 60 is, therefore, adapted to reset the rotary accumulator wheel 400 in one angular direction to its "zero" angular position by rotation of the preselector reset shaft 60 one complete revolution. A power or torsion spring 420 which is provided for biasing the accumulator wheel 400 in the opposite angular direction is connected to the gear 404 so that the spring 420 is loaded when the accumulator wheel 400 is reset.

The coin-operated presetter means is provided with a stack of three indexing mechanisms 422 for indexing the accumulator wheel 400 an angular amount proportional to the value of the coins of each of the three denominations for which the coin preselector is designed. The three different denominations of coins may for example have relative values of 2, 3 and 5.

The accumulator wheel 400 is rotatably mounted on shaft 48 and is held against rotation by the power spring 420 by an elongated idler gear 426 in mesh with a gear 428 formed on the accumulator wheel 400 and a one-way locking pawl 430 pivotally biased into engagement with the idler gear 426 by a light torsion spring 431. Accordingly the locking pawl 430 prevents uncontrolled rotation of the accumulator wheel 400, in the clockwise direction as viewed in FIGS. 7 and 12. Each coin operated indexing mechanism 422 provides for releasing the accumulator wheel for angular displacement proportional to the value of each of the coins of the appropriate denomination passing therethrough. Referring to FIGS. 7, 10 and 11, each indexing mechanism 422 comprises a control gear 434 rotatable on a pivotal control lever 436 and having a locking sector 437 and a tooth sector 438 with a number of teeth corresponding to the relative value of the respective denomination. The control gear 434 is mounted for limited angular rotation on the lever 436 and is biased to an angular withdrawn position shown in FIG. 10 in engagement with a shoulder 435 of the lever 436 by a light torsion spring 439.

The control lever 436 is normally held in a withdrawn position shown in FIG. 10 by a compression spring 446, in which position the control gear 434 is adapted to be held in its withdrawn angular position by the torsion spring 439. Pivotal coin operated levers 450 which extend into chutes 54, 55, 56 respectively are adapted to actuate arms 452 of the control levers 436 and to displace the compression springs 446 and thereby provide an overcenter biasing action on the control levers for snap operation thereof. Thus when the outer end of a lever 450 is struck by a coin falling in the corresponding chute the weight and inertia of the coin is sufficient to provide for pivotal actuation of the lever 450 and snap actuation of the respective control gear 434 into engagement with the idler 426 and concomitant actuation of the locking pawl 430 into engagement with the tailend of the lever 436 to pivot the locking pawl out of engagement with the idler gear 426. As a result, as seen in FIG. 11 the relatively strong accumulator power spring 420 is adapted to rotate the accumulator wheel 400 an angular amount determined by the number of teeth on the control gear 434.

After the coin passes through the chute the coin actuated lever 450 and the control lever 436 are returned to their normal position by the spring 446 and the locking pawl 430 is concomitantly pivoted into engagement with the idler gear 426 to prevent further rotation of the accumulator wheel 400.

Referring to FIGS. 7, 9 and 12 the coin operated accumulator has a maximum capacity and when "fully loaded" provides for ejecting succeeding or excess coins out an overload or coin return chute 62 (FIG. 1). For this purpose, each of the denomination chutes 54, 55, 56 has a through chute section 451 receiving the corresponding lever 450 and an eject or return chute section 454 having an inclined fixed deflector 456 for returning coins passing downwardly therethrough into the return chute 62. Deflectors or shutters 460 are pivotally mounted intermediate the chute sections 451, 454 of the chutes 54, 55, 56 and are pivotally controlled by a linkage which includes a transverse connecting link 462, a bellcrank 463, a link 464 and an operating lever 466 mounted on shaft 467 and adapted to be actuated by the accumulator wheel 400. The operating lever 466 is biased in one pivotal direction by a tension spring 468 to position the shutters 460 for directing the coins into the through chute sections 451 and therefore into engagement with the levers 450. When, however, the accumulator wheel 400 reaches a "fully loaded" angular position a cam 470 on the accumulator wheel 400 is adapted to actuate the operating lever 466 to "close" the shutters 460 against the bias of the spring 468 and thereby divert all of the succeeding coins into the overload chute sections 454 for returning these "excess" coins to the depositer. The cam 470 is positioned on the accumulator wheel 400 so that it engages the operating lever 466 when the accumulator wheel 400 is angularly indexed or loaded by the deposited coins an angular amount somewhat less than 360° and so that the accumulator wheel 400 can be angularly loaded subsequently to the actuation of the lever 466 by an amount corresponding to the value of the last deposited coin accepted by the coin preselector. For illustration, the position of the cam 470 is shown in broken lines in FIG. 12 where it would be with the accumulator wheel 400 in its zero angular position and where it would be with the accumulator wheel 400 one step prior to reaching its "fully loaded" position.

Figure 8:
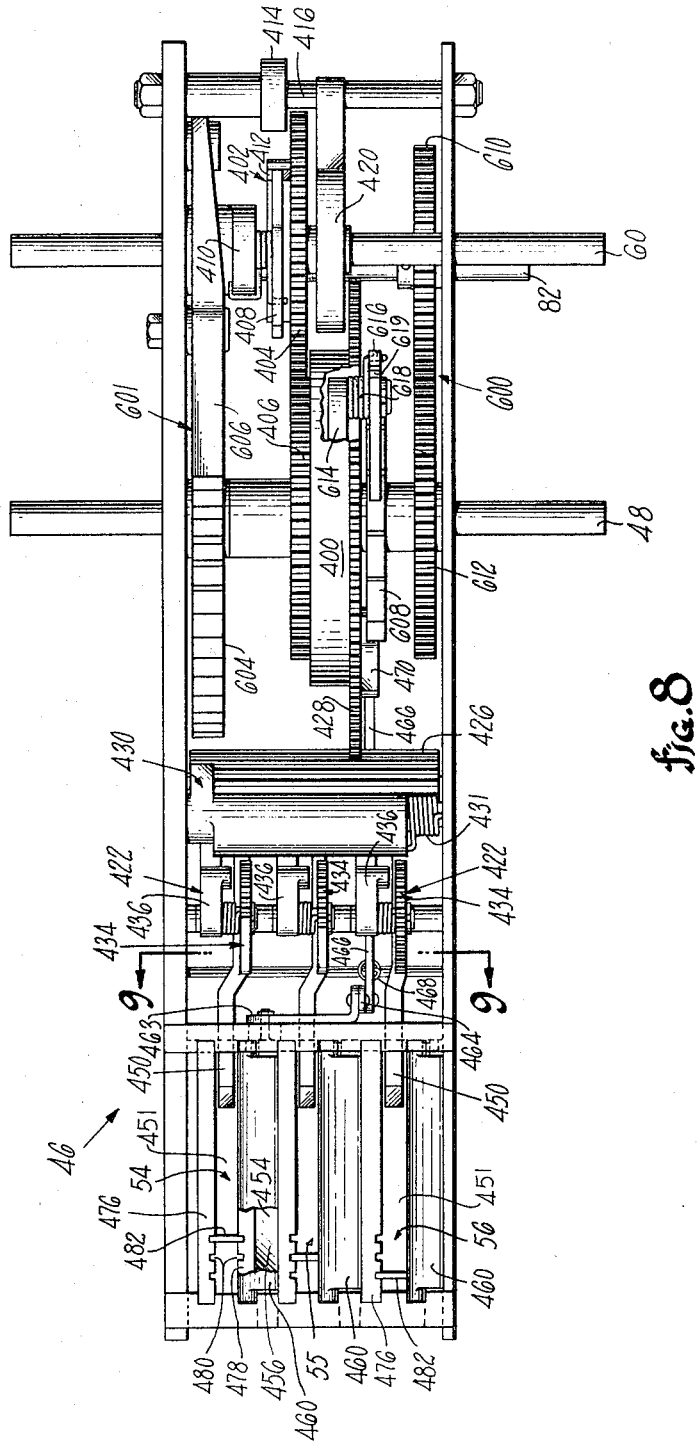
FIG. 8 is an enlarged top plan view, partly broken away of the combined coin operated presetter and scanner.

Referring to FIGS. 7 and 8 the through sections 451 of the chutes 54, 55, 56 are formed by parallel dividers or partitions 476, 478 having pairs of opposed vertically extending slots 480. The pairs of opposed slots 480 provide for selectively positioning a partition 482 in accordance with the diameter of the coin or check for which the chute is employed.

Figure 13:
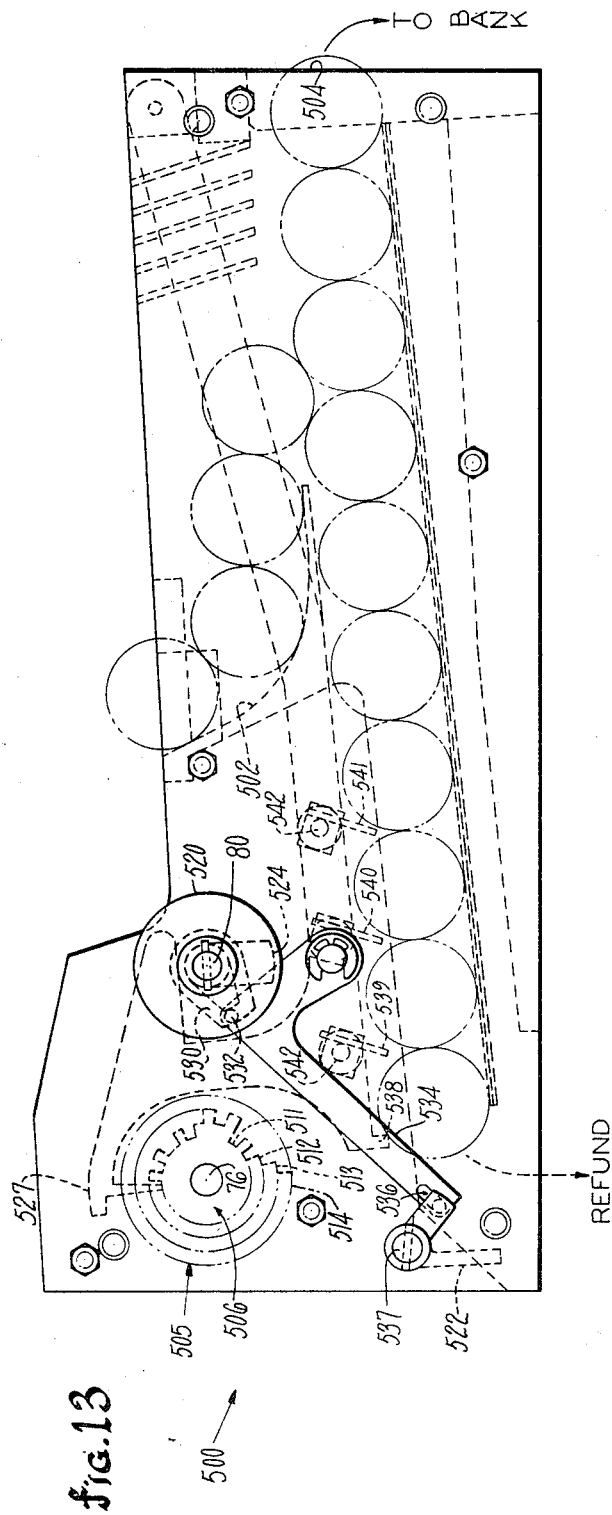
FIG. 13 is a side elevation view of a combined coin reservoir and coin refund mechanism of the control system showing the lowest denomination magazine and associated mechanism thereof in a nonrefunding position.
Figure 15:
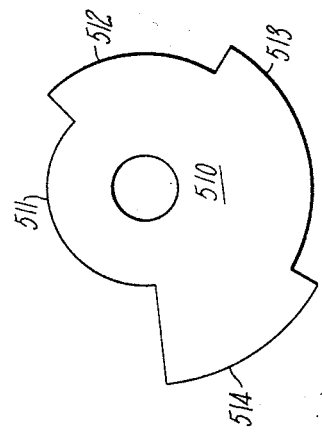
FIGS. 14 and 15 are enlarged views of control cams employed with the intermediate and highest denomination magazines and associated mechanisms of the combined coin reservoir and coin refund mechanism.
Figure 14:
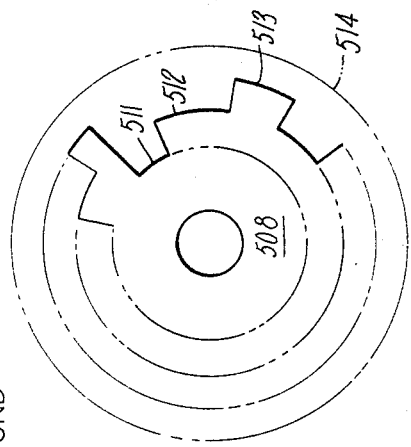

Coins that are accepted by the coin preselector pass down chutes 64, 65, 66 (FIG. 1) to a combined coin reservoir and coin refund mechanism 70 (FIG. 13) having three coin magazines 500 with inclined slots in which the coins are stacked in upstanding edge-to-edge relationship. The magazines have curved entry guides 502 for guiding the coins from the chutes 64, 65, 66 thereto and have rearward openings 504 for directing the overflow or excess coins into a bank 74 (FIG. 1) when the respective magazines are full.

Coins are adapted to be selectively ejected or freed from the coin magazines for selectively returning these coins via a return chute 72 and for thereby providing for approximate reimbursement for the balance of the fuel which has been paid for and not delivered when the delivery is terminated by replacing the fuel nozzle 18 in its storage receptacle 30. More particularly, the coin refund mechanism comprises a rotary coin return controller 505 having a drive or control shaft 76 which is connected to the preset shaft 40 and the preselector output shaft 48 so that its angular position continuously represents the amount of the fuel set into the preset mechanism 34 and remaining to be delivered. Thus, when a delivery is terminated before the full amount paid for is dispensed, the angular position of the coin return controller 505 will represent the value of the coins to be returned. The controller 505 comprises three control cams 506, 508, 510 which are mounted on the control shaft 76 for rotation thereby for selectively controlling the amount of coins to be refunded from each of the three magazines 500 respectively. Thus for each angular position of the preset wheel 200 the control cams 506, 508, 510 are positioned to provide for refunding coins having a total value approximately corresponding to the amount of fuel paid for and undelivered. For this purpose the control cams 506, 508, 510 have stair-step cam edges with four steps 511, 512, 513, 514 for respectively refunding 0, 1, 2 and 3 coins.

Figure 16:
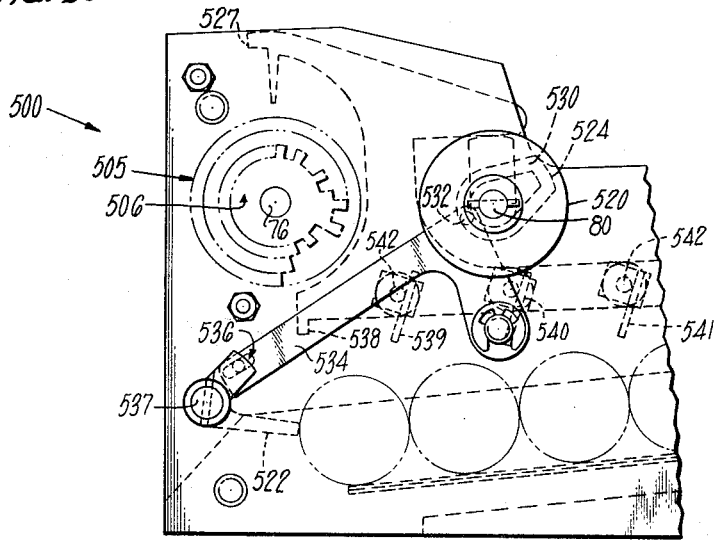
FIGS. 16 and 17 are fragmentary views of the lowest denomination magazine and associated mechanism in an inactive position and a two-coin release position respectively.
Figure 17:
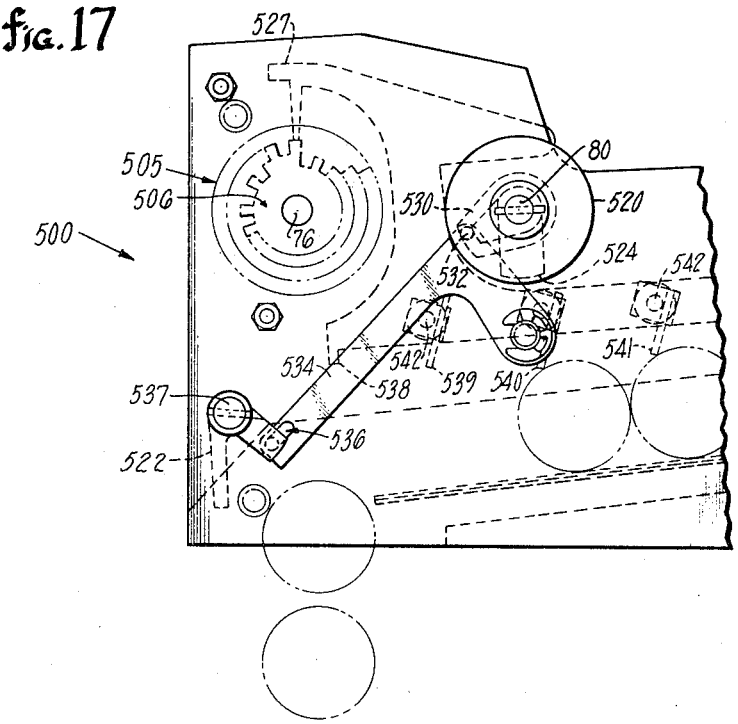

The coin refund mechanism also comprises a coin return mechanism which is operated by a coin return shaft 80. A cam 520 is mounted on the return shaft for operating gates 522 for the magazines 500 and axially spaced cams 524 are mounted on the return shaft for operating three axially spaced control cam sensing fingers or arms 527 for the magazines 500 respectively. More particularly the cam 520 has a cam track 530 which receives a pin or follower 532 on a lever 534. The lever 534 is in turn connected by a pin and slot connection 536 for pivoting a gate operating shaft 537 for pivoting the gates 522 between their withdrawn or open positions shown in FIGS. 13 and 17 and their closed positions shown in FIG. 16. The gates 522 are adapted to be closed at the beginning of a first one-half revolution or first phase of angular operation of the shaft 80, in the clockwise direction as viewed in FIGS. 13, 16 and 17, to its angualr position shown in FIG. 16 and to be opened at the end of the second or succeeding phase or one-half revolution of angular operation of the shaft 80 in the same angular direction to its angular position shown in FIGS. 13 and 17.

The elongated sensing arms 527 are operated by the cams 524 respectively to withdraw the sensing arms 527 after the gates 522 have been closed and to lower the sensing arms 527 before the gates 522 are reopened. Each of the sensing arms 527 has a plurality of coin stops 538, 539, 540, 541 which are positioned along the arms and within the coin slots of the magazines 500 so as to be adapted to be engaged by the first, second, third and fourth coins respectively in the respective magazine slots when the gates 522 are opened. It can be seen however that the pivotal position of the sensing arms and therefore the radii of the active steps on the control cams determine whether one, two, three or four of the stops are lowered sufficiently to be engaged by the coins in the magazines. Thus when a sensing arm engages the lowest step 511 on the respective control cam, the sensing arm is fully lowered to position all of the stops for engagement by the coins. When a sensing arm engages a step 512, the arm is positioned with the stop 538 withdrawn sufficiently to release or refund the lowest coin in the magazine. When an arm engages a step 513, the arm is positioned with the stops 539 and 540 withdrawn for refunding two coins from the magazine and when an arm engages a step 514, the arm is positioned with the stops 538, 539 and 540 withdrawn for refunding three coins. Accordingly the angular position of the rotary controller determines the amount of money to be refunded and the control cams 506, 508, 510 are designed to provide for refunding coins having a value approximately equal to (and never greater than) the amount of fuel paid for and undelivered. The coin return controller 505 is connected to the preset wheel 200 (and is set with the preset wheel) so as to provide for refunding coins having a total value which is one unit in value less than the value of fuel represented by the angular position of the preset wheel.

The stop 538 is shown formed by an integral tab on the sensing arm 527. The remaining stops 539, 540 and 541 are shown designed so that they can be adjusted in accordance with the diameter of the coin or check for which the respective magazine is employed, and for this reason the stops 539, 540 and 541 comprise pins 542 which are mounted for axial and angular adjustment. Also the gates 522 when closed preferably provide for retaining the coins in the magazine slots so that they will not be engaged by the stops when the sensing fingers 527 are lowered.

The coin return shaft 80 is operated in proper sequence with the remaining components of the control system and is rotated through a first phase or one-half revolution of operation just prior to the beginning of the delivery when the nozzle 18 is removed from its storage receptacle and is rotated through a second phase or remaining one-half revolution of operation after the completion of the delivery when the nozzle is replaced in its storage receptacle. Also the sensing arms 527 are adapted to be withdrawn during the initial part of the first phase of operation of the shaft 80 to provide for freeing the control cams 524 before the preset wheel 200 (and thus the control shaft 76) is rotated to set the preset mechanism 34 for the succeeding delivery.

A scanning device comprising individual scanners 600 (FIG. 7) and 700 (FIG. 6) for the coin operated and manual preselectors respectively is employed for sensing the amount preselected with the push buttons 300 (or control lever 314) or the angular position of the "loaded" accumulator wheel 400, and for rotating or setting the preset wheel 200 to an angular position corresponding to the setting of the manual preselector or coin operated preselector. The scanners 600, 700 have input shafts 82, 84 respectively and a combined output or driven shaft 48 which is adapted to be angularly indexed in accordance with the amount preselected. The output shaft 48 is connected with the preset shaft 40 for rotating the preset shaft, in the counterclockwise direction as viewed in FIG. 2, and for rotation with the preset shaft 40 in the same angular direction during the succeeding delivery of fuel. The scanner input shafts 82, 84 are sdapted to be selectively driven through suitable clutch means 88, 89, and a pair of detent mechanisms 601, 701 are employed for ensuring that the scanner output shaft 48 is accurately indexed. In particular the detent mechanism 601 (FIG. 7) is shown comprising a thirty-three tooth detent wheel 604 fixed to the output shaft 48 and a pivotal detent pawl 606 in engagement therewith. The detent mechanism 701 (FIG. 6) on the other hand is shown comprising a twenty-two tooth stationary internal detent wheel 702 and a pivotal detent pawl 703 mounted on the shaft 48 and biased into engagement with the detent wheel 702 by a tension spring 704.

Referring to FIGS. 7, 8 and 12, the scanner 600 for the coin operated preselector comprises a one-way drive ratchet wheel 608 which is rotated, in the counterclockwise angular direction as viewed in FIGS. 7 and 12, by an input gear 610 driven by the scanner drive shaft 82 and meshing with a gear 612 rotatably mounted on the output shaft 48 and suitably keyed to the drive ratchet wheel 608. An arm 614 is fixed to the shaft 48 and a ratchet pawl 616 pivotally mounted on the arm 614 is biased for operative engagement with the ratchet wheel 608 by a torsion spring 618. The cam 470 on the accumulator wheel 400 is adapted to engage the tailend 619 of the ratchet pawl 616 to pivot the pawl 616 out of engagement with the ratchet wheel 608. Accordingly, this one-way ratchet drive provides for rotating the output shaft 48, and the cam 470 provides for disengaging the ratchet drive when the output shaft 48 has been appropriately oriented in accordance with the accumulator loading or setting.

It can be seen that the output shaft 48 is rotated by the ratchet drive in an angular direction opposite to the angular direction in which the accumulator wheel 400 is preset or loaded by the deposited coins. Thus, the resulting angular setting of the output shaft 48 and the angular setting of the preset shaft 40 and preset wheel 200 is the difference between 360° and the angular loading or setting of the accumulator. However, since the preset wheel 200 is indexed during the delivery of fuel in the same angular direction in which it is originally set with the scanner output shaft 48, the preset wheel 200 will be, it can be seen, properly set in accordance with the loading of the accumulator wheel 400.

Figure 3:
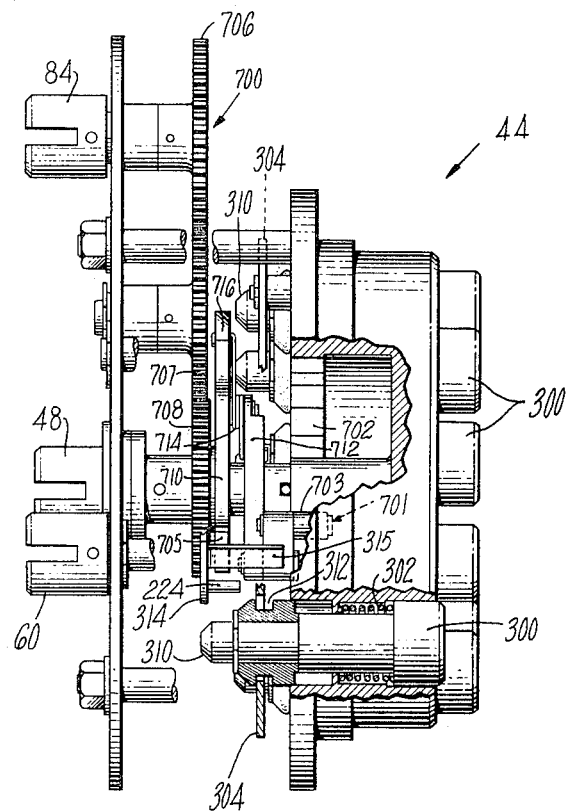
FIG. 3 is a side elevation view, partly broken away and partly in section of a combined manual presetter and scanner therefor employed in the control system.
Figure 4:
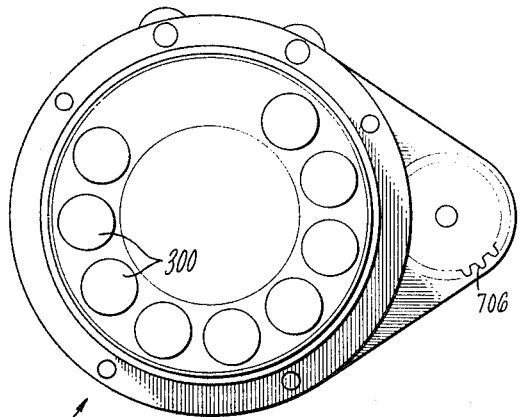
FIG. 4 is a reduced front elevation view of the combined manual presetter and scanner.
Figure 5:
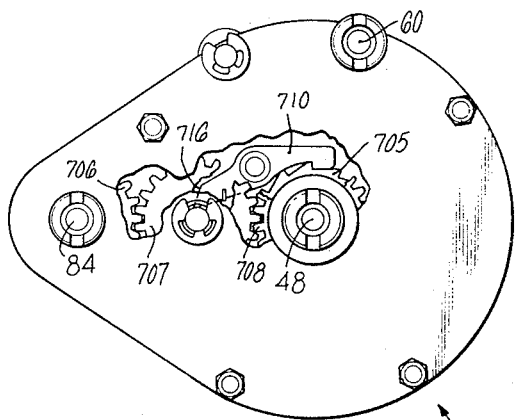
FIG. 5 is a reduced rear elevation view, partly broken away, of the combined manual presetter and scanner.

Referring to FIGS. 3, 5 and 6 the scanner 700 employed for scanning the setting of the push button pre-selector operates and is constructed similarly to the scanner 600. The scanner 700 comprises a ratchet drive wheel 705 rotatably mounted on the scanner output shaft 48 and rotated, in the clockwise direction as viewed in FIG. 5 by the scanner input shaft 84 through the gears 706, 707, and 708. A ratchet pawl 710 pivotally mounted on an arm 712 fixed to the output shaft 48 is biased for engagement with the ratchet wheel 705 by a torsion spring 714. Accordingly, upon rotation of the ratchet wheel 705, in the clockwise direction as viewed in FIG. 5, the output shaft 48 is adapted to be rotated in the same angular direction as it is rotated with the scanner 600.

The ratchet pawl 710 has a tailend 716 which is adapted to engage the inner end of the push buttons 300 when they are in their depressed or "active" positions and to engage the tab 315 of the control lever 314 when the lever is in its "active" position. The ratchet pawl 710 is thereby adapted to be selectively withdrawn from the ratchet wheel 704 to selectively disengage the ratchet drive and accordingly to angularly set the scanner output shaft 48 and the preset wheel 200 in accordance with the angular position of the button depressed or the angular position of the tab 315. As the scanners 600, 700 employ one-way ratchet drive mechanisms, it can be seen that the shaft 48 can be selectively operated with either scanner and the scanner output shaft 48 can be continuously rotated with the preset shaft 40 and the preset wheel 200 during the subsequent delivery of fuel.

Thus after the coin operated accumulator has been loaded by the deposited coins, or after the manual pre-selector has been manually set, the scanner input shafts 82, 84 can be rotated to set the preset wheel 200 to an angular position which corresponds to the selection established by either the accumulator loading or the manual preselector depending on the selective engagement of the clutch means 88, 89. Also, if the clutch means 89 is engaged for manual preslection the coin refund mechanism and printer are deactivated with suitable clutch means 90 shown diagrammatically in FIG. 1.

A ticket printer 92 may be employed for printing and thereby recording the volume and cost of fuel delivered and the total value of the used coins. For this purpose the printer may be provided with a printing counter which is driven by a money shaft 94 for recording the cost of the fuel delivered, a printing counter which is driven by a volume shaft 95 for recording the volume of the fuel delivered, and a printing counter which is driven by a used coin shaft 96, for recording the value of the coins used for paying for the fuel delivery. The used coin shaft 96 is driven by the preset shaft 40, and the shafts 94, 95 are driven through clutches 97, 98 respectively, by the money shaft 36 and a volume shaft 100 driven with the volume counter 22. Accordingly the cost and volume printing counters may be disconnected, for example when the volume and cost information is not desired.

The printer 92 is adapted to be operated to print, cut and eject a ticket 102 by rotation of a printer control shaft 104 through approximately one-half revolution, and to subsequently reset the printing counters to zero by rotation of the printer control shaft 104 through the remaining approximately one-half revolution. The used coin printing counter may (1) be set with the preset shaft 48 and then be disconnected from the preset shaft by operation of the control shaft 104 if it is desired to record the total value of the coins inserted, as for example when the control system does not incorporate a coin refund mechanism, or (2) be reset by the control shaft 104 after the preset mechanism 34 is preset or loaded for the following delivery and then digitally indexed with the preset mechanism, as for example if it is desired to record the total value of the coin retained after the completion of the fuel delivery and a refund is made for the fuel paid for and not delivered before terminating the delivery by returning the nozzle 18 to its storage receptacle. In the latter situation the used coin printing counter is reset to one unit value (the value of the lowest denomination of coin used) and is digitally indexed with the preset wheel 200 to provide for printing the amount of money deposited minus the amount of money which would be refunded as determined by the angular position of the rotary coin refund controller 505.

Referring to FIGS. 18–21 a printer is shown for recording the value of coins used or retained after the termination of the delivery and a refund if any is made.

The printer is shown comprising a used coin printing counter 720 for printing the amount of used coins, a fixed information printing roll 722 for printing, for example an identifying number and location of the equipment, and a settable printer 724 for printing the date and the price of gasoline. The printers 720 and 724 have backup rolls 725 and 726 respectively with raised pressure pads 727 for cooperation with selected lines of printing characters on the printers. A backup roll 728 cooperates with the fixed information printing roll 722 for printing the several lines of print on the printing roll. Also if conventional paper is employed the backup roll 728 and the raised pressure pads 727 may be constructed of sintered metal and impregnated with a suitable printing ink.

The counter 720 is indexed by the shaft 96 through a gear train comprising the gears 730–736. The gear 734 is rotatable on the counter shaft 737, the gear 736 is fixed to the lowest order print wheel 738 of the counter and the gear or pinion 735 is mounted on the transfer pinion shaft 739. The remaining pinion 735 on the transfer pinion shaft 739 is provided for indexing the higher order print wheel 738 in a conventional manner, and the transfer pinion shaft 739 is mounted so that it may be withdrawn by a lever mechanism 740 so that the print wheels 738 may be disengaged from the pinions 735 during the printing phase and while the print wheels are reset by the counter shaft or reset shaft 737.

A print drive shaft 741 (on which the gear 733 is rotatably mounted) is connected for rotating the print wheels 738 and is connected through a timing belt 744 and suitable gearing (not shown) for rotating the printing roll 722, the date printer 724, a feed roll 742 and their respective backup rolls. The print drive shaft 741 is connected to each print wheel 738 of the printing counter 720 through ratchet drive mechanisms 748 (FIGS. 19 and 20) which comprise drive pawls 750 pivotally mounted on discs 752 keyed to the print drive shaft 741, driven ratchet wheels 754 rotatable upon the shaft 741 and gears 756 integrally connected to the ratchet wheels and in mesh with the drive gears of the corresponding print wheels 738. The drive shaft 741 is adapted to be rotated, in the clockwise direction as viewed in FIGS.

18 and 20 to rotate the print wheels 738 in unison. A release member 760 is mounted for engaging the tailend of the drive pawl 750 during the last portion of the printing phase and for thereby disconnecting the printing wheels from the drive shaft 741 and permitting the reset shaft 737 to be rotated prior to the completion of the printing phase for initiating the counter reset phase of operation.

The printer control shaft 104 is provided with a first cam 762 for operating the lever mechanism 740 for withdrawing the pinions 735 during the printing and reset phases and for returning the pinions 735 into engagement with the print wheel gears 736 and the gear 734 after the print wheels 738 are fully reset. A second cam 764 is fixed to the printer control shaft 104 for pivoting a guillotine operating lever 766. The lever 766 is thereby operated to withdraw a pivotal guillotine blade 768 of the guillotine 770 during the reset phase and to release the blade 768 immediately after the completion of the printing phase. A ticket 102 (FIG. 1) is thereby provided which gives a record of the fuel delivery.

A sector gear 772 is fixed to the control shaft 104 for engagement with (1) a gear 774 fixed to the drive shaft 741 for rotating the drive shaft through one complete revolution to carry out the printing phase and (2) an idler gear 776 in mesh with a gear 778 fixed to the reset shaft 737 for rotating the reset shaft through one complete revolution to carry out the reset phase.

Figure 20:
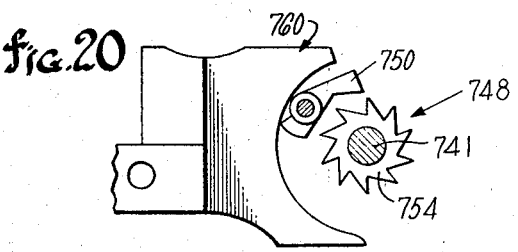
FIG. 20 is an enlarged partial longitudinal section view, partly broken away and partly in section, of the printer.
Figure 21:
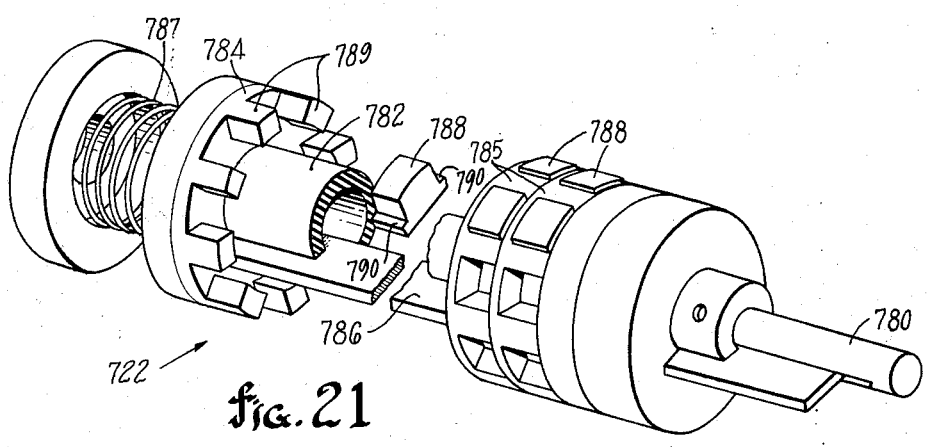
FIG. 21 is an enlarged partly exploded perspective view, partly broken away and partly in section, of a printing roll of the printer.

Referring to FIG. 20 the fixed information printing roll 722 comprises a shaft 780, a resilient generally cylindrical sleeve 782 receiving the shaft 780 and a plurality of annular castellated members 784, 785 which are axially reciprocable on the sleeve 782. The sleeve 782 and the castellated members 784, 785 are keyed to the shaft 780 by an elongated key 786, and the castellated members 784, 785 may be axially withdrawn against the bias of a compression spring 787 to provide for inserting and removing inserts 788 between the axial projections 789 of the castellated members. The inserts 788 have suitable raised printing type (not shown) on their outer faces and are provided with inner shoulders 790 for securely retaining the inserts between the axial projections 789 and with their inner faces in engagement with the resilient sleeve 782. Accordingly the individual type inserts 788 are mounted to automatically adjust for appropriate cooperation with the backup roll 728 because of the resiliency of the sleeve 782.

Referring to FIGS. 1, 22 and 23 the various components of the control system are operated by a power operator 110 having an electrical motor 800 and an output or drive shaft 112 driven by the electrical motor through a reduction gearing comprising a worm 814, worm gear 816 and pairs of meshing gears 818, 820 and 822, 824. The electrical motor 800 is controlled by the withdrawal of the dispensing nozzle 18 from and replacement of the nozzle in the receptacle 30. For this purpose the nozzle operated lever 32 is connected to operate a two position control or rocker shaft 826 of the power operator 110.

A pair of series connected normally closed motor switches 836, 838 are mounted on the control plate 830 and a switch actuator or cam 840 is mounted on the drive shaft 112 for alternative actuation of the switches 836, 838 for opening the electrical circuit to the motor. The electric drive motor 800 is adapted to be energized by pivoting the control plate 830 with the switch leaf springs 842 to withdraw the "open" switch from the cam 840 and for returning the other switch into position for engagement by the cam 840 for subsequent de-energization of the motor 800.

Figure 18:
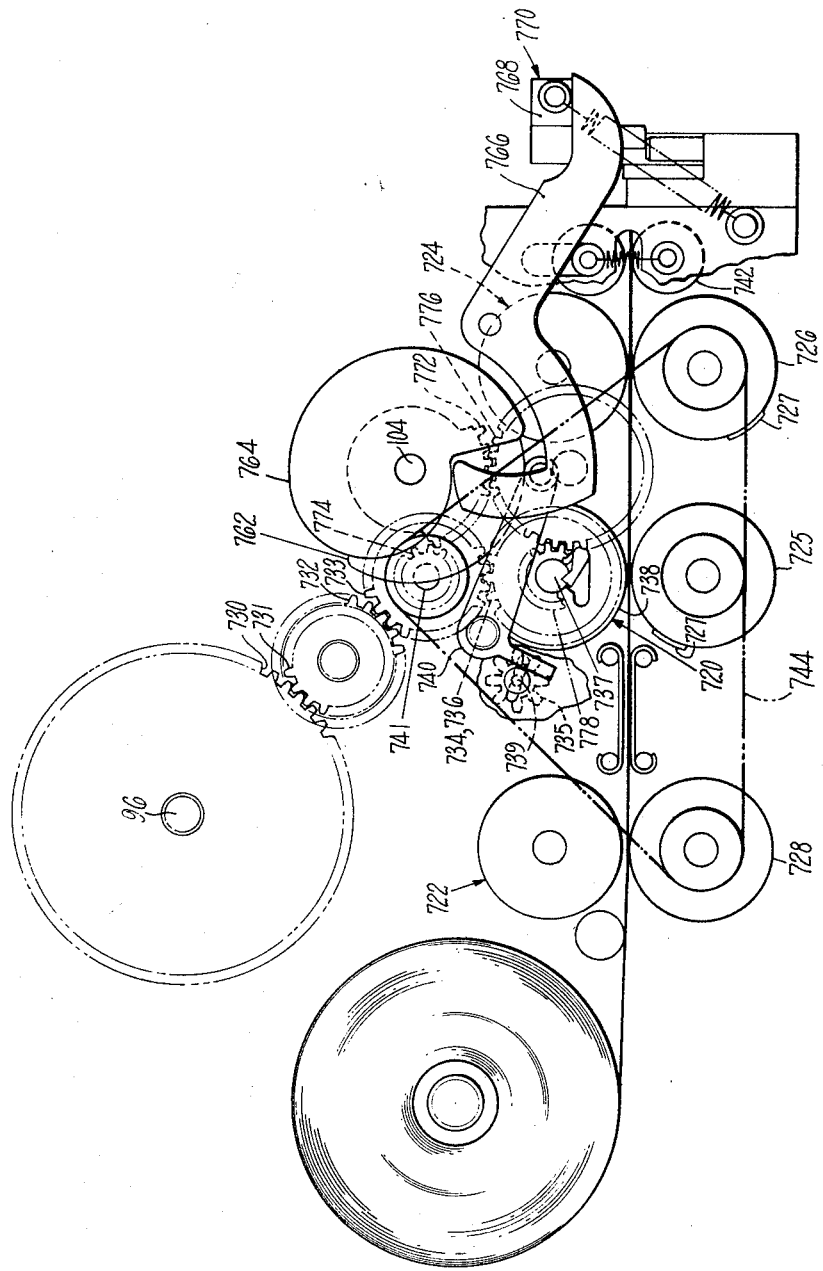
FIG. 18 is a generally diagrammatic side elevation view, partly broken away, of a printer employed in the control system.
Figure 19:
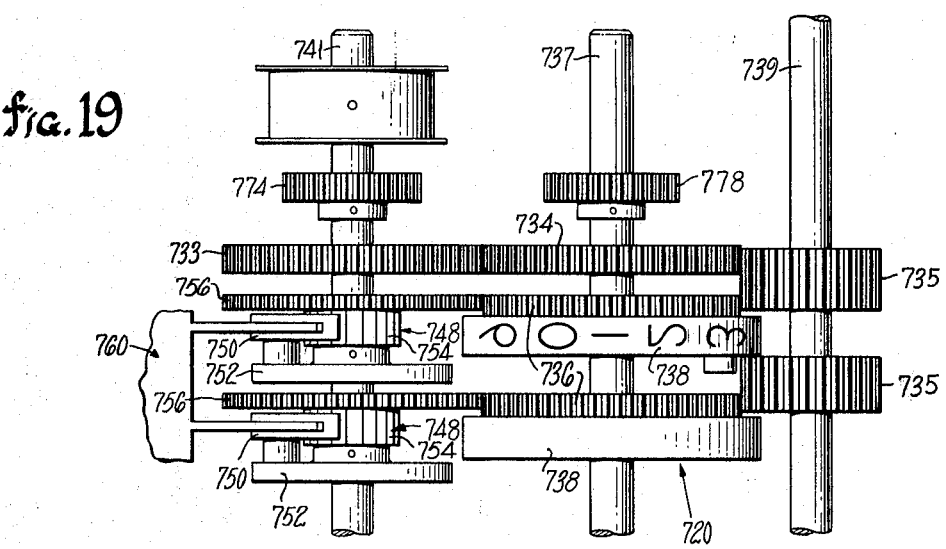
FIG. 19 is an enlarged partial transverse section view, partly broken away and partly in section, of the printer.

A lever 827 which controls the pivotal operation of the plate 830 is mounted on the rocker shaft 826 and biased, in the counterclockwise direction as viewed in FIG. 18, to its "off" position by a tension spring 828. A post 832 is mounted on the lever 827 for alternatively pivoting locking arms 833, 834 against the bias of an interconnecting spring 835 for selectively withdrawing the locking arms out of locking engagement with a square post 837 on the plate 830. When the locking arm 833 is pivoted, in the clockwise direction as viewed in FIG. 18, by the pivotal movement of the control lever 827 to its "on" position, the locking shoulder 839 is withdrawn to permit the switch plate 830 to be pivoted, in the clockwise direction as viewed in FIG. 18, and to thereby energize the motor 800 through its "on" phase of operation which accompanies the removal of the fuel nozzle 18 from its storage receptacle. Similarly, when the lever 827 is pivoted to its "off" position, the locking shoulder 841 is withdrawn to energize the motor 800 through its "off" phase of operation which accompanies the replacement of the fuel nozzle 18 in its storage receptacle.

An eddy current brake 846 is provided to prevent excessive overtravel of the cam 840 when the motor is de-energized and thus to prevent untimely or inadvertent re-energization of the motor. In the shown embodiment the switches 836, 838 are mounted on the control plate 830 so that the electric motor is adapted to be energized for substantially one-half a revolution each time the plate 830 is pivoted to its alternative operating position. Thus, when the nozzle 18 is removed from the receptacle 30 the electric drive motor 800 is temporarily energized to rotate the drive shaft 112 through a first one-half of a revolution, and when the nozzle is replaced in its receptacle, the motor 800 is temporarily energized to rotate the drive shaft 112 through the remaining one-half of a revolution. The power operator is therefore controlled to provide a first or "on" phase of operation immediately preceding the delivery and a second or "off" phase of operation after the completion of the delivery.

The drive shaft 112 may be connected to de-energize the pump motor 12 as the shaft 112 is rotated during its "off" phase of operation and thus to de-energize the pump motor 12 after the delivery is completed. Alternatively the pump motor could be de-energized in a conventional manner with the nozzle actuated lever 32.

Intermittent gearing, including a gear sector 114 mounted on the drive shaft 112 and gears 115, 116 on a pair of alternatively driven intermediate drive shafts 117, 118 respectively provide for driving certain components of the control system with the intermediate drive shaft 117 when the nozzle is removed from its receptacle 30, and with the intermediate drive shaft 118 when the nozzle is replaced in its receptacle. More particularly, during the "on" phase of operation of the power operator, the intermediate shaft 117 is rotated one full revolution to (1) rotate the reset shaft 28 one revolution and thereby reset the register 26, (2) rotate one of the scanner drive shafts 82, 84 and thereby set the preset wheel 200 in accordance with the amount of fuel preselected by the deposit of coins or by the manual preselector, and (3) rotate a shaft 122 to load and trip a fuel delivery timer 120. The timer 120 is connected so as to operate the power operator 110 through its second or "off" phase of operation after a predetermined interval of time, for example five minutes, and thereby provide a safety shut-off device if the nozzle has not been previously returned to its storage receptacle 30.

When the nozzle 18 is replaced in its storage receptacle 30, the intermediate shaft 118 is rotated one full revolution for rotating the preselector reset shaft 60 one revolution and thereby reset the accumulator to its "zero" position and release the depressed push button, if any, of the manual preselector and depress the control lever 314.

The coin return shaft 80 is connected (if the clutch means 90 (FIG. 1) is engaged) to be driven by the drive shaft 112 so as to lower the sensing fingers 527 and open the gates 522 when the nozzle is replaced in its storage receptacle and so as to close the gates 522 and withdraw the sensing fingers 527 when the nozzle is removed from the storage receptacle.

Also (if the clutch means 90 is engaged) the printer control shaft 104 is connected to be driven by the drive shaft 112 so that the printing counters are reset when the nozzle is removed from its receptacle and so that the printer is operated to print, shear and eject a ticket when the nozzle is replaced in its storage receptacle 30.

A linkage and interlock arrangement is shown in FIG. 24 for (1) alternatively setting up the control system for coin operation or manual operation, (2) preventing energization of the motor 800 through its "on" phase of operation before coins totaling a minimum value have been deposited when the control system is set up for coin operation, and (3) for closing the coin shutters 460 for returning all coins deposited after the nozzle is removed from its storage receptacle. This linkage and interlock arrangement includes a manual selector handle 903 which is mounted on shaft 904 and pivoted between a "manual" position and a "coin" position shown in FIG. 24. A lever 906 fixed to the shaft 904 is connected to reciprocate a selector slide 908 mounted for limited reciprocal movement on guide pins 909, 910, and a clutch operating lever 914 pivotally mounted on stub shaft 916 is pivoted by the selector slide 908 between two positions corresponding to the "manual" and "coin" positions of the slide. The clutch operating lever 914 has three upstanding stubs 915, 916, 917 which provide for selectively disengaging the clutches 88, 89, 90 respectively. Each of these clutches 88–90 comprises a single notch drive cam or ratchet wheel 921, a driven arm 922, and a ratchet pawl 923 pivotally mounted on the arm 922 and biased into engagement with cam 921. The studs 915–917 are positioned for cooperation with the tailends of the detent pawls 923 so as to provide for selective disengagement of the pawls 923 from the corresponding cams 921 and accordingly for selective disengagement of the clutches 88–90.

The output shaft 112 of the power operator is connected for driving the cam 921 of the clutch 90, and the intermediate drive shaft 117 is connected through the gears 926, 928, 930 for driving the clutch cams 921 of the clutches 88, 89. The driven arms 922 of the clutches 88, 89 are connected to drive the scanner input shafts 82, 84 respectively, and the driven arm 922 of the clutch 90 is connected to drive the coin return shaft 80 (FIG. 1) and the printer control shaft 104.

With the selector handle 903 in its "coin" position, the stud 916 will provide for disengaging the clutch 89 to disconnect the drive to the scanner input shaft 84 for the manual preselector, and the studs 915 and 917 will be withdrawn to permit engagement of the clutches 88, 90. Similarly when the selector handle 903 is pivoted to its "manual" position the clutch control lever 914 will be pivoted to provide for engagement of the clutch 89 and for disengagement of the clutches 88, 90 in order to disconnect the drive to (1) the scanner input shaft 82 for the coin preselector, (2) the coin return shaft 80, and (3) the printer control shaft 104.

The nozzle operated lever 32 (FIG. 1) is connected to operate a control cam 940 through lever 942 and link 944. The control cam 940 is adapted to be pivoted between an "off" position shown in FIG. 24 when the fuel nozzle 18 is stored in its receptacle 30 and an "on" position when the fuel nozzle 18 is removed from its storage receptacle. When the nozzle is removed from its storage receptacle a shutter operating lever 948 which is controlled by the cam 940 is pivoted by a tension spring 949, in the clockwise direction as viewed in FIG. 24, to close the coin shutters 460 and thereby provide for returning all coins deposited after the fuel nozzle is removed. Also, the selector slide 908 is provided with a pin 952 which engages the outer end of the lever 948 to close the shutters when "manual" operation is selected.

The rocker shaft 826 is adapted to be operated by the cam 940, through a lever 961, link 962, lever 964, and a horizontally reciprocable motor control slide 966. A follower or post 968 mounted on the forward end of the control slide 966 is engageable with the cam 940, and with the selector handle 903 in its "coin" position the slide 966 is adapted to be actuated with the tension spring 949 through a lever 969 having an upstanding pin 971 received in a slot in the slide 966.

The lever 969 is adapted to be restrained against pivotal operation, in the counterclockwise direction as viewed in FIG. 24, if the fuel nozzle is removed from its storage receptacle before coins totaling a predetermined minimum value have been deposited. For this purpose a cam 980 is fixed for rotation with the accumulator wheel 400, and a sensing lever 982 is pivotally mounted for engagement with the cam 980 and connected through shaft 984 to the lever 969 for pivotal movement into engagement with the cam 980 when the nozzle is removed. The cam 980 is contoured with a projection or lobe 986 engageable by the end of the sensing lever 982 to prevent pivotal operation of the lever 969 when the nozzle is removed from its storage receptacle before the accumulator wheel 400 is angularly indexed an amount coresponding to the predetermined minimum value. Consequently the motor 800 will not be energized when the nozzle is removed and, as the shutters 460 will have been closed when the nozzle is removed it will be necessary to replace the nozzle in its storage receptacle and deposit additional coins before fuel can be delivered.

A tension spring 990 connected to a lever 992 is provided for operating the motor control slide 966 when the selector handle 903 is in its "manual" position. The lever 992 is released when the selector handle 903 is pivoted to its "manual" position and is withdrawn by a pin 994 on the lever 906 to deactivate the spring 990 when the selector handle 903 is pivoted to select "coin" operation.

It has been found desirable to operate the motor 800 through a complete cycle when the selector handle 903 is repositioned to change the control system from "manual" operation to "coin" operation or vice versa. For this purpose the link 962 is adapted to be disengaged from the lever 961 and is provided with a tail end 995 which is engageable by the pin 952 when the selector shaft 904 is repositioned to either of its alternative operating positions. Also, a trip cam 996 is mounted on the motor control shaft 826 and a trip pin 997 is mounted on the selector slide 908 to momentarily operate the motor control shaft 826 to its "on" pivotal position and to thereby operate the motor 800 through both phases of its cycle when the selector handle 903 is repositioned to either of its operating positions. Of course, as soon as the motor control shaft 826 is returned to its "off" position by the tension spring 828 the link 962 will become re-engaged with the lever 961.

The timer 120 is adapted to be loaded through the clutch 88 when "coin" operation is selected. A lever 998 mounted on the timer shaft 122 is temporarily engaged by a pin 999 driven by the shaft 82 and is thereby pivoted through a limited angle, in the clockwise direction as viewed in FIG. 24, to load the timer during the "on" phase of operation of the power operator 110. The lever 998 when released returns in the opposite pivotal direction at a rate controlled by a suitable escapement mechanism to its normal or inactive position shown in FIG. 24. The lever 998 is connected to withdraw the link 962 and thereby disengage the control link from the lever 961 after a predetermined period of time, for example five minutes, as it returns to its normal position. For this purpose the lever 998 is connected to actuate a lever 1000 pivotally mounted on the link 962 and spring biased to its normal position shown in FIG. 24, through a trip pawl 1002 engageable with the lever 1000 and an interconnecting link 1006.

The control system is of modular construction and the various components of the control system are combined so that one or more of these compnents could be left out of the system. For example, either the manual preselector or the coin operated preselector and its associated equipment could be left out of the system. Also the printer and/or the timer could be left out of the system and the power operator could be readily removed and replaced with a manually operable crank handle for example.

Also the coin reservoir and coin return mechanism could be left out and thereby do away with the reimbursement for the undelivered fuel. In this instance the printing counter for printing the value of the used coins may be set by the shaft 96 when the rotary preset wheel is loaded and then be disengaged from the shaft 96 to provide a record of the total value of the inserted coins.

The control mechnaism of the invention is primarily intended for use in conjunction with fuel dispensing pumps, but it is to be understood that the control system of the invention can be used with other dispensing apparatus.

As will be apparent to persons skilled in the art, various modifications and adaptations of the structure above described will become readily apparent without departure from the spirit and scope of the invention, the scope of which is defined in the appended claims.

We claim:

1. A fluid dispensing apparatus control system for controlling the amount of the fluid delivered, comprising a control mechanism operable for conditioning the apparatus for deliverying fluid and for terminating the delivery after a preset amount of fluid is delivered, the control mechanism having a presetting mechanism settable before the commencement of a fluid delivery for presetting the amount of the fluid delivery, a preselecting device manually settable independently of the presetting mechanism for preselecting the amount of fluid to be delivered, and delivery initiating means for operating the control mechanism to set the presetting mechanism in accordance with the setting of the preselecting device and to thereafter condition the apparatus for delivering fluid.

2. A control system according to claim 1, wherein the presetting mechanism comprises rotary control means angularly setable for controlling the amount of the fluid delivery.

3. A control system according to claim 2, wherein the rotary control means is adapted to be indexed in one angular direction in accordance with the amount of fluid delivery, and wherein the presetting mechanism comprises means for terminating the fluid delivery when the rotary control means reaches a predetermined angular position.

4. A control system for controlling the amount of fluid delivered by fluid dispensing apparatus, comprising a presetting mechanism for controlling the amount of the fluid delivery, preseter means for preselecting the amount of fluid to be delivered, a scanning device operable for setting the presetting mechanism in accordance with the preselected amount of the presetter means; the presetting mechanism comprising rotary control means angularly settable for controlling the amount of the fluid delivery and connected to be indexed in one angular direction in accordance with the amount of fluid delivered; and means for terminating the fluid delivery when the rotary control means reaches a predetermined angular position, the scanning device providing for angularly setting the rotary control means in said one angular direction.

5. A control system for controlling the amount of fluid delivered by fluid dispensing apparatus, comprising a presetting mechanism for controlling the amount of the fluid delivery, presetter means for preselecting the amount of fluid to be delivered, and a scanning device operable for setting the presetting mechanism in accordance with the preselected amount of the presetter means, the scanning device comprising a scanner output operable for setting the presetting mechanism and a scanner input connected for operating the scanner output in accordance with the preselected amount of the presetter means.

6. A control system according to claim 5, wherein the scanning device comprises disengageable means connecting the scanner input and output, and wherein the presetter means is operative to disengage the disengageable means so as to disengage the scanner input and output when the presetting mechanism is set in accordance with the preselected amount of the presetter means.

7. A control system according to claim 6, wherein the disengageable means provides one-way drive means between the scanner input and output.

8. A control system according to claim 6 wherein the disengageable means comprises a driving ratchet wheel and a driven ratchet pawl mounted for rotation coaxially with the ratchet wheel means, said pawl being engageable with the ratchet wheel for engagement of the disengageable means, and wherein the presetter means comprises pawl release means for selectively disengaging the ratchet pawl from the ratchet wheel in accordance with the preselected amount of the presetter means.

9. A control system according to claim 8, wherein said pawl release means comprises stop means engageable by the ratchet pawl and selectively positionable for selectively disengaging the ratchet pawl from the ratchet wheel.

10. A control system for controlling the amount of fluid delivered by fluid dispensing apparatus, comprising a presetting mechanism for controlling the amount of the fluid delivery, presetter means for preselecting the amount of fluid to be delivered, and a scanning device operable for setting the presetting mechanism in accordance with the preselected amount of the presetter means, the presetter means comprising a rotary preselector adapted to be angularly positioned to preselect the amount of fluid to be delivered.

11. A control system according to claim 10, wherein the scanning device is operable for setting the presetting mechanism in accordance with the angular position of the rotary preselector.

12. A control system according to claim 11, wherein said rotary preselector is adapted to be rotated in one angular direction for increasing the preselected amount, and wherein the scanning device is rotatable in the opposite angular direction for setting the presetting mechanism.

13. A control system according to claim 10 wherein the rotary preselector comprises a coin-operated mechanism.

14. A control system according to claim 13, wherein the coin-operated mechanism includes preselector indexing means for angularly indexing the rotary preselector in accordance with the value of deposited coins.

15. A control system according to claim 14, wherein said preselector indexing means provides for angularly indexing the rotary preselector from a predetermined angular position thereof in accordance with the value of the deposited coins, and wherein the angular position to which the rotary preselector is indexed is representative of the value of the coins deposited and accordingly the preselected amount of fluid to be delivered.

16. A control system according to claim 13 comprising coin refund means operable for providing a refund at the end of the delivery in accordance with the difference between the amount of fluid preselected with the coin-operated mechanism and the amount of the fluid delivered.

17. A control system according to claim 16, wherein the refund means comprises a settable refund controller for controlling the amount of refund.

18. A control system according to claim 17, wherein the refund controller is set in accordance with the setting of the presetting mechanism for establishing a refund in accordance with said difference.

19. A control system according to claim 17 wherein said refund controller is rotatable and angularly settable for controlling the amount of refund, and wherein the rotatable refund controller is angularly positioned at the end of a fluid delivery in accordance with said difference.

20. A control system according to claim 17 wherein the refund controller and the presetting mechanism are mechanically coupled so that the refund controller is continuously set in accordance with the setting of the presetting mechanism.

21. A control system according to claim 17 wherein the refund controller is set by the scanning device when it is operated for setting the presetting mechanism.

22. A control system according to claim 17 wherein the coin refund means includes coin reservoir means and coin return means operable for returning coins from the reservoir means in accordance with the setting of the refund controller.

23. A control system according to claim 22, wherein the coin return means is operable for de-activating the refund means before the commencement of the fluid delivery, and is operable for returning coins from the reservoir means in accordance with the setting of the refund controller after the completion of the fluid delivery.

24. A control system according to claim 1 wherein the preselecting device comprises manual preselector means for manually preselecting the amount of fluid to be delivered.

25. A control system according to claim 24 wherein the preselecting device comprises coin operated means adapted for preselecting the amount of fluid to be delivered, and further comprising selector means operable for alternatively conditioning the control mechanism for setting the presetting mechanism in accordance with the amount preselected by the manual preselector means or the coin operated means.

26. A control system according to claim 25 wherein the coin-operated means comprises a rotary coin-operated preselector adapted to be angularly positioned to preselect the amount of fluid to be delivered, and further comprising coin refund means operable for providing a refund at the end of the delivery in accordance with the difference between the amount of fluid preselected with the coin-operated means and the amount of the fluid delivered, and wherein said selector means is operable to de-activate the refund means when it is operated to condition the scanning device for setting the presetting mechanism in accordance with the amount preselected by the manual preselector means.

27. A fluid dispensing apparatus control system for controlling the amount of the fluid delivered comprising a rotary coin operated presetting mechanism angularly settable before the commerncement of a fluid delivery in accordance with the value of deposited coins and angularly indexable in accordance with the delivery of fluid for terminating the delivery after the preset amount of fluid is delivered, and resettable printing means operable for recording the fluid delivery, the improvement wherein the resettable printing means comprises a resettable used-coin printing counter for printing the monetary amount of the coins used for payment for the fluid delivery having a rotary input adapted to be selectively coupled to the rotary presetting mechanism for being indexed therewith during the delivery of fluid for recording the monetary amount of the used coins and to be selectively uncoupled from the rotary presetting mechanism for relative rotation with respect thereto, and means, for resetting the used-coin printing counter such that the printing counter is at zero at the commencement of a fluid delivery.

28. In a fluid dispensing system having an operating cycle with delivery and nondelivery phases, a register connected for registering the amount of the fluid delivered during the delivery phase and resettable between fluid deliveries during the nondelivery phase, auxiliary apparatus operable through an operating cycle thereof during each operating cycle of he fluid dispensing system, a power operator with a rotary output, and means interconnecting the rotary output of the power operator with the register and auxiliary apparatus for resetting the register during the nondelivery phase and for operating the auxiliary apparatus through its operating cycle during each operating cycle of the fluid dispensing system, the improvement wherein the interconnecting means comprises intermittent drive means operable for re-setting the register and for operating the auxiliary apparatus through its said operating cycle during first and second separate phases of operation of the power operator output in one angular direction.

29. In the fluid dispensing system of claim 28 wherein the power operator is operable to independently rotate its output shaft through said first and second separate phases of operation and further comprising control means for sequentially operating the power opeartor to rotate its output shaft through said first and second separate phases of operation respectively.

30. In the fluid dispensing system of claim 29 wherein the power operator is an electric motor and wherein the control means comprises switch actuating means driven by the electric motor and switch means actuated by the switch actuating means to de-energize the electric motor at the end of each of said first and second separate phases of operation.

31. In the fluid dispensing system of claim 30 wherein the control means comprises a pivotal control lever adapted to be pivoted for operating the electric motor, and wherein said switch means is mounted on the pivotal lever and connected for energizing and de-energizing the electric motor in accordance with the pivotal operation of the control lever.

32. In the fluid dispensing system of claim 31 wherein said switch means comprises a pair of normally closed switches connected in series and adapted to be selectively actuated by the switch actuating means in accordance with the pivotal position of the control lever to de-energize the electric motor.

33. In the fluid dispensing system of claim 32 wherein the control means comprises locking means for selectively locking the lever in each of two pivotal positions at which the pair of normally closed switches are positioned respectively for actuation by the switch actuating means to de-energize the electric motor.

34. In the fluid dispensing system of claim 28 further comprising a dispensing nozzle for delivering fluid, a nozzle receptacle for storing the nozzle between fluid deliveries, and control means associated with the nozzle receptacle for effecting said first phase of operation of the power operator in conjunction with the removal of the nozzle from its storage receptacle before the commencement of a fluid delivery and for effecting said second phase of operation of the power operator in conjunction wit the repacement of the nozzle in its storage receptacle after the completion of the fluid delivery.

35. In the fluid dispensing system of claim 34 wherein the control means comprises nozzle actuated means associated with the nozzle receptacle for effecting said first and second phases of operation of the power operator.

36. In the fluid dispensing system of claim 28 wherein said auxiliary apparatus is a preset mechanism settable for presetting the amount of the fluid delivery and wherein the intermittent drive means is operable for resetting the preset mechanism to a zero setting during the second phase of operation of the power operator.

37. In the fluid dispensing system of claim 28 wherein the auxiliary apparatus is a printer operable by the intermittent drive means for printing the amount of the fluid delivery during said second phase of operation of the power operator.

38. In the fluid dispensing system of claim 28 wherein the auxiliary apparatus is a coin mechanism adapted to be set by the deposit of coins for controlling the amount of the succeeding delivery in accordance with the value of the deposited coins and having a coin refund mechanism operable by the intermittent drive means during the second phase of operation of the powder operator for refunding coins in accordance with the difference between the amount of the deposited coins and the amount of the fluid delivered.

39. In a fluid dispensing system having an operating cycle with delivery and nondelivery phases, first and second associated apparatus operable through operating cycles thereof respectively for each operating cycle of the fluid dispensing system, a power operator with a rotary output, and means interconnecting the power operator output with the first and second associated apparatus for operating the first and second associated apparatus through said operating cycles respectively during each operating cycle of the fluid dispensing system, the improvement wherein the interconnecting means comprises intermittent drive means operable for operating the first and second associated apparatus through their respective operating cycles during first and second separate phases of operation of the power operator output respectively in one angular direction.

40. In the fluid dispensing system of claim 39 further comprising control means for the power operator selectively operable for effecting operation of the power operator output through its said first and second separate phases of operation before the commencement and after the completion of each delivery respectively.

41. A fluid dispensing apparatus control system for controlling the amount of fluid to be delivered comprising a coin operated rotary presetting mechanism angularly settable in accordance with the value of the deposited coins for presetting the amount of the fluid to be delivered and angularly indexable during the delivery for terminating the delivery after the preset amount of fluid is delivered, and coin refund means operable for providing a refund at the end of a delivery having a rotary refund controller coupled to the rotary presetting mechanism for controlling the amount of the refund in accordance with the difference between the amount of fluid selected by the deposit of coins and the amount of fluid delivered, coin reservoir means, and coin return means operable at the end of a fluid delivery for returning coins from the reservoir means in accordance with the setting of the refund controller.

42. A control system according to claim 41 wherein the coin return means is operable for de-activating the refund means before the commencement of the fluid delivery and is operable for returning coins from the reservoir means in accordance with the setting of the refund controller after the completion of the fluid delivery and further comprising motor means for operating the coin return means after the completion of the fluid delivery for returning coins in accordance with the setting of the refund controller and to de-activate the refund mechanism before the commencement of the fluid delivery.

43. A control system for controlling the amount of fluid delivered by fluid dispensing apparatus, comprising a presetting mechanism for controlling the amount of the fluid delivery, presetter means for preselecting the amount of fluid to be delivered, and a scanning device operable for setting the presetting mechanism in accordance with the preselected amount of the presetter means; the presetter means comprising a manual preselector means for manually preselecting the amount of fluid to be delivered and coin operated means adapted for preselecting the amount of fluid to be delivered; and selector means operable for alternatively conditioning the scanning device for setting the presetting mechanism in accordance with the amount preselected by the manual preselector means or the coin operated means, the selector means comprising scanner clutch means for alternatively conditioning the scanning device for setting the presetting mechanism in accordance with the amount of preselected by the manual preselector means or the coin operated means.

44. A control system according to claim 43, wherein the scanner clutch means comprises first clutch means for the manual preselector means and second clutch means for the coin-operated means, and wherein the selector means is manually operable for alternatively disengaging the first and second clutch means.

45. A control system according to claim 44, wherein said first and second clutch means each comprise a driving ratchet wheel and a driven pivotal ratchet pawl engageable with the ratchet wheel for engagement of the clutch means and adapted to be pivotally withdrawn for disengagement of the clutch means, and wherein the selector means further comprises clutch control means manually operable for alternatively pivotally withdrawing the ratchet pawls of the first and second clutch means.

46. A control system according to claim 45, wherein the driving ratchet wheels have a single notch.

References Cited
UNITED STATES PATENTS

| | | | |
|---|---|---|---|
| 2,649,947 | 8/1953 | Nelsen | 194—10 |
| 3,187,939 | 6/1965 | Hayes | 222—2 X |
| 3,254,749 | 6/1966 | Scherer | 194—13 X |
| 2,777,555 | 1/1957 | Banning | 222—30 X |

SAMUEL F. COLEMAN, Primary Examiner

U.S. Cl. X.R.

194—53; 222—2

UNITED STATES PATENT OFFICE

CERTIFICATE OF CORRECTION

Patent No. 3,478,854   Dated November 18, 1969

Lawrence Dilger & Ernest S. Ashford

It is certified that error appears in the above-identified patent and that said Letters Patent is hereby corrected as shown below:

In the specification, column 1, line 9, the priority date of --April 1, 1966-- should be added to the date of "January 24, 1967"; line 10 the year "67" should read --66--.

SIGNED AND
SEALED
JUL 7 1970

(SEAL)
Attest:

Edward M. Fletcher, Jr.
Attesting Officer

WILLIAM E. SCHUYLER, JR.
Commissioner of Patents